United States Patent
Koch et al.

(10) Patent No.: US 11,140,806 B2
(45) Date of Patent: Oct. 12, 2021

(54) AGRICULTURAL TOOLBAR APPARATUS, SYSTEMS, AND METHODS

(71) Applicant: Precision Planting, LLC, Tremont, IL (US)

(72) Inventors: Dale M. Koch, Tremont, IL (US); Jason Stoller, Eureka, IL (US)

(73) Assignee: Precision Planting LLC, Tremont, IL (US)

( * ) Notice: Subject to any disclaimer, the term of this patent is extended or adjusted under 35 U.S.C. 154(b) by 124 days.

(21) Appl. No.: 16/734,558

(22) Filed: Jan. 6, 2020

(65) Prior Publication Data

US 2020/0137942 A1 May 7, 2020

Related U.S. Application Data

(63) Continuation of application No. 16/176,409, filed on Oct. 31, 2018, now Pat. No. 10,555,453, which is a continuation of application No. 15/889,187, filed on Feb. 5, 2018, now Pat. No. 10,194,576, which is a continuation of application No. 14/374,749, filed as application No. PCT/US2013/023287 on Jan. 25, 2013, now Pat. No. 9,883,623.

(60) Provisional application No. 61/590,643, filed on Jan. 25, 2012.

(51) Int. Cl.
| | |
|---|---|
| *G06F 7/70* | (2006.01) |
| *A01B 73/06* | (2006.01) |
| *A01B 63/114* | (2006.01) |
| *A01B 63/14* | (2006.01) |
| *A01B 73/04* | (2006.01) |

(52) U.S. Cl.
CPC ........ *A01B 73/065* (2013.01); *A01B 63/1145* (2013.01); *A01B 63/145* (2013.01); *A01B 73/044* (2013.01)

(58) Field of Classification Search
CPC ... A01B 73/065; A01B 79/005; A01B 69/008; A01B 63/1145; A01B 63/145; A01B 73/044; E02F 9/2022; E02F 9/26; E02F 9/204; G06F 7/70
USPC ......... 701/50, 36; 111/135, 185, 200; 172/4, 172/311, 448, 452
See application file for complete search history.

(56) References Cited

U.S. PATENT DOCUMENTS

| | | | | |
|---|---|---|---|---|
| 4,858,698 A * | 8/1989 | Williamson | ....... | A01B 63/1145 172/448 |
| 5,488,996 A * | 2/1996 | Barry | .................. | A01B 73/065 172/311 |
| 6,068,064 A * | 5/2000 | Bettin | .................... | A01B 63/32 172/413 |
| 6,112,827 A * | 9/2000 | Reiber | .................... | A01B 63/32 172/311 |
| 6,318,477 B1 * | 11/2001 | Bettin | .................... | A01B 63/32 172/452 |
| 7,712,544 B1 * | 5/2010 | Misenhelder | ........ | A01B 73/065 172/311 |
| 8,235,133 B2 * | 8/2012 | Friggstad | ............ | B60B 33/0005 172/386 |
| 8,275,525 B2 * | 9/2012 | Kowalchuk | ............ | A01C 7/205 701/50 |

(Continued)

*Primary Examiner* — Shardul D Patel

(57) ABSTRACT

Systems, methods, and apparatus for shifting weight between a tractor and toolbar and between sections of the toolbar and for folding a toolbar between a field position and a transport position.

16 Claims, 23 Drawing Sheets

(56) References Cited

U.S. PATENT DOCUMENTS

| | | | |
|---|---|---|---|
| 8,925,439 B2* | 1/2015 | Greenwood | A01B 63/1006 |
| | | | 91/445 |
| 10,555,453 B2* | 2/2020 | Koch | A01B 63/1145 |
| 2002/0017090 A1* | 2/2002 | Hockenbeck | A01B 63/32 |
| | | | 56/16.2 |
| 2005/0058968 A1* | 3/2005 | Chinedu | G09B 5/00 |
| | | | 434/118 |
| 2010/0180808 A1* | 7/2010 | Liu | A01C 7/205 |
| | | | 111/130 |
| 2012/0048519 A1* | 3/2012 | Gruss | F28D 15/0266 |
| | | | 165/104.26 |

* cited by examiner

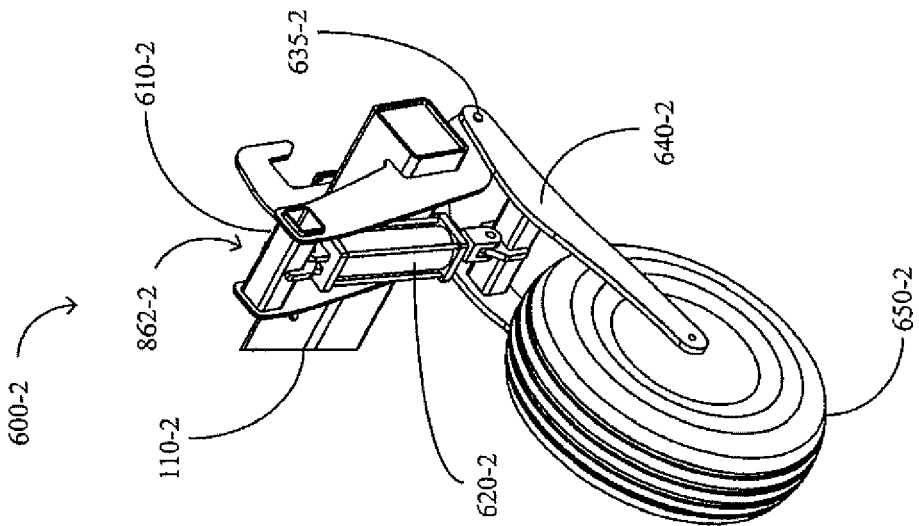
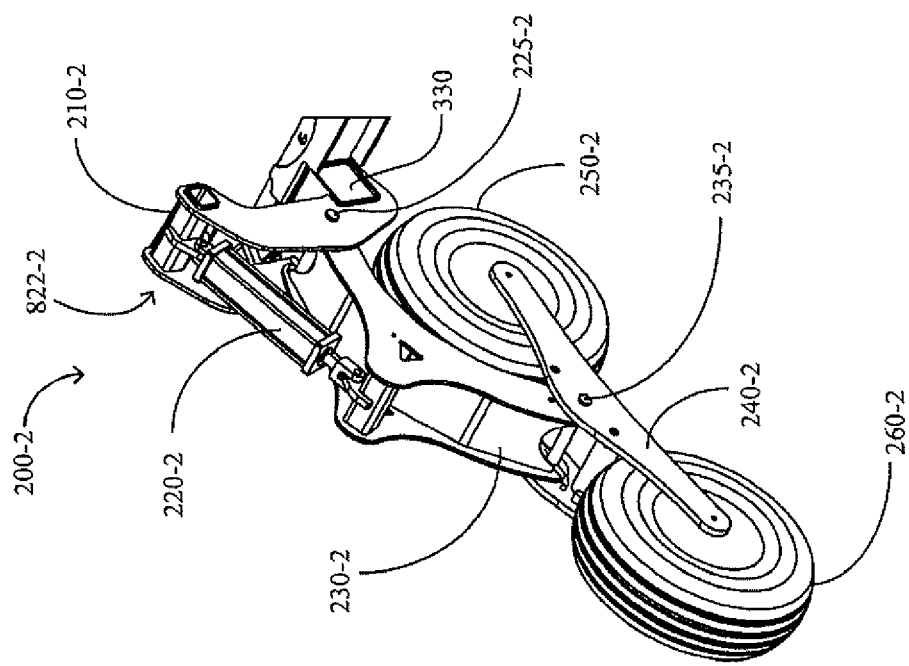
FIG. 8A
FIG. 8B

AGRICULTURAL TOOLBAR APPARATUS, SYSTEMS, AND METHODS

CROSS-REFERENCE TO RELATED APPLICATIONS

This application is a continuation of U.S. patent application Ser. No. 16/176,409, "Agricultural Toolbar Apparatus, Systems, and Methods," filed Oct. 31, 2018; which application is a continuation of U.S. patent application Ser. No. 15/889,187, filed Feb. 5, 2018, now U.S. Pat. No. 10,194,576; which application is a continuation of U.S. patent application Ser. No. 14/374,749, filed Jul. 25, 2014, now U.S. Pat. No. 9,883,623; which application was a national phase entry under 35 U.S.C. § 371 of International Patent Application PCT/US2013/023287, filed Jan. 25, 2013, designating the United States of America and published in English as International Patent Publication WO 2013/112929 A1 on Aug. 1, 2013, which claimed the benefit of the filing date of U. S. Provisional Patent Application 61/590,643, filed Jan. 25, 2012, the entire disclosure of each of which is incorporated herein by reference.

BACKGROUND

Agricultural toolbars such as planters have become larger and heavier as farming operations have become larger. Thus growers have increasingly recognized the potential to improve yield by reducing compaction damage by such toolbars. As a result, there is a need in the art for systems, apparatus, and methods of shifting weight between the toolbar and the tractor and between sections of the toolbar in order to reduce agronomic damage from compaction. Additionally, the time pressure in performing planting operations has created a need in the art for effective and efficient systems, apparatus, and methods of folding agricultural toolbars between field position and a planting position, and especially for toolbars having a field position in which turns and changes in topography are effectively negotiated.

DESCRIPTION OF THE DRAWINGS

FIG. 8A is a rear perspective view of an embodiment of a center wheel assembly of the agricultural toolbar of FIG. 1.

FIG. 8B is a rear perspective view of an embodiment of a wing wheel assembly of the agricultural toolbar of FIG. 1.

DESCRIPTION

Figure 1:
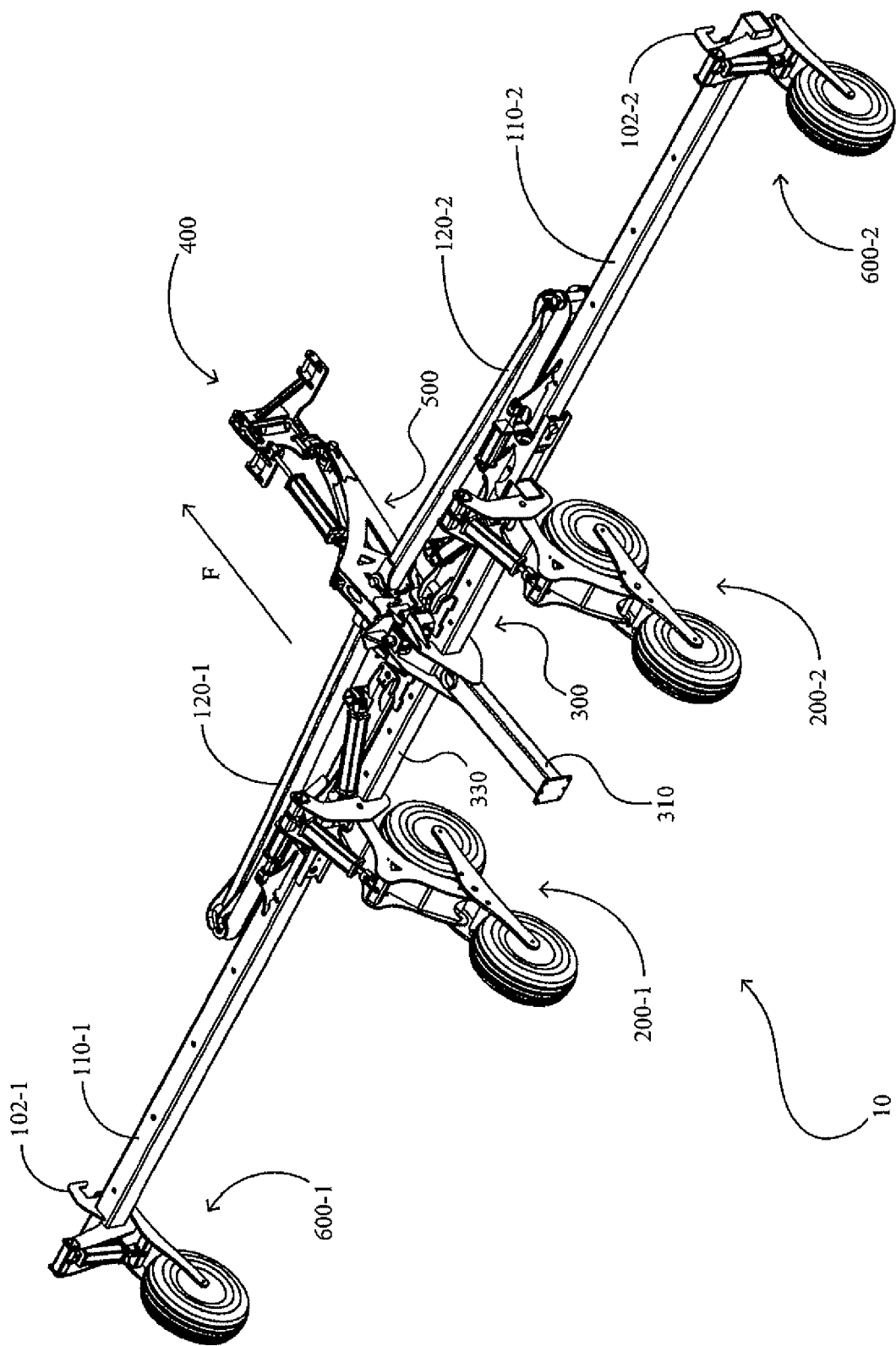
FIG. 1 is a rear perspective view of an embodiment of an agricultural toolbar.
Figure 2:
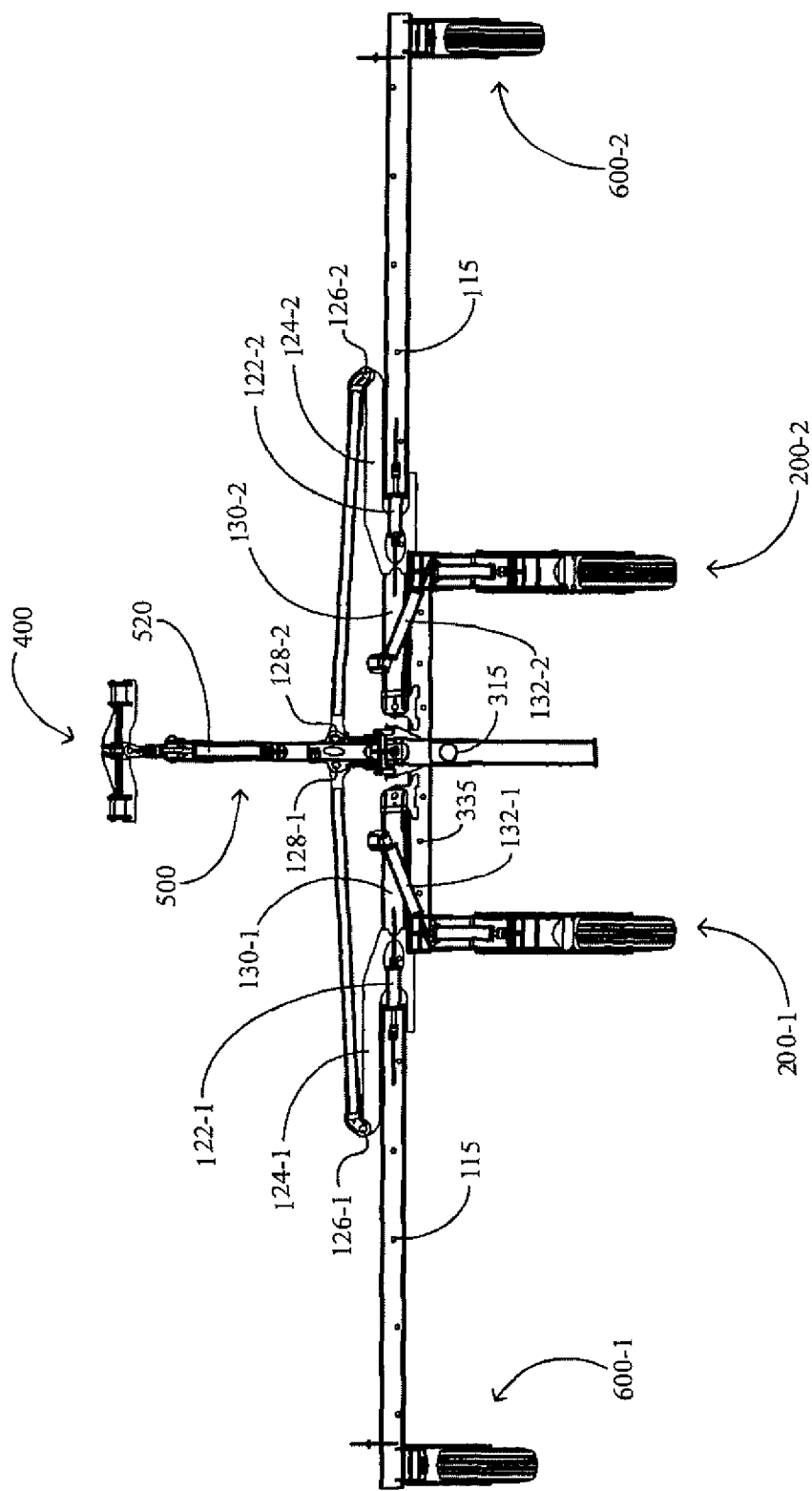
FIG. 2 is a top view of an embodiment of an agricultural toolbar of FIG. 1.

Referring now to the drawings, wherein like reference numerals designate identical or corresponding parts throughout the several views, FIGS. 1-10 illustrate an agricultural toolbar 10. Referring to FIGS. 1 and 2, the toolbar 10 is coupled to a tractor (not shown) by a hitch assembly 400 and thereby drawn in the direction indicated by arrow F. The hitch assembly 400 is coupled to a weight transfer assembly 500. The weight transfer assembly 500 is preferably pivotally connected to draft tubes 120 by pins 128 for relative motion about substantially vertical axes defined by the pins 128. The draft tubes 120 are preferably pivotally coupled to doglegs 124 by pins 126 for relative motion about substantially vertical axes defined by the pins 126. Doglegs 124 are preferably rigidly coupled to inner wing sections 130. The inner wing sections 130 are preferably pivotally coupled to outer wing sections 110 by pins 123 (see FIG. 7) for relative motion about substantially horizontal axes defined by each pin 123. It should be appreciated that the doglegs 124 permit the draft tubes 120 to rotate relative to wing sections 110 about an axis forward of the outer wing sections 110 and outboard of the inner wing sections 130 without directly coupling the draft tubes to the outer wing sections such that the outer wing sections are free to pivot about the pins 123 without interference. The inner wing sections 130 are pivotally coupled to a center bar 330 by pins 334 (see FIG. 7) for relative motion about substantially vertical axes defined by the pins 334. A center section 300 includes the center bar 330 and preferably further includes an attachment tube 310 rigidly coupled to the center bar 330.

Wing wheel assemblies 600 are preferably pivotally coupled to distal ends of outer wing sections 110. Center wheel assemblies 200 are preferably pivotally coupled to distal ends of the center bar 330.

Comparing FIGS. 1 and 2 to FIGS. 9 and 10, the toolbar 10 is illustrated in its field and transport positions, respectively. In the field position of FIGS. 1 and 2, the inner wing sections 130 and outer wing sections 110 are in substantial alignment with the center bar 330 and the draft tubes 120 are in a generally transverse position. As the toolbar unfolds from the field position to the transport position, the inner and outer wing sections 130, 110 and the doglegs 124 rotate forward and away from the center bar 330, while the draft tubes 120 translate forward and rotate such that the inner ends of the draft tubes move generally forward while the distal ends of the draft tubes move both inward and forward. During folding between the field and transport positions, the inner wing sections 130, the doglegs 124 and the draft tubes 120 form a diamond-shaped arrangement. Once the toolbar 10 is in the transport position of FIGS. 9 and 10, the inner and outer wing sections 130, 110 are substantially perpendicular to the center bar 330 and the draft tubes 120 and doglegs 124 are substantially parallel to one another in a generally longitudinal position. It should be appreciated that the term "longitudinal" as used herein refers to the direction parallel to the direction of travel while the term "transverse" refers to the direction normal to the direction of travel and parallel to the ground surface.

Figure 7:
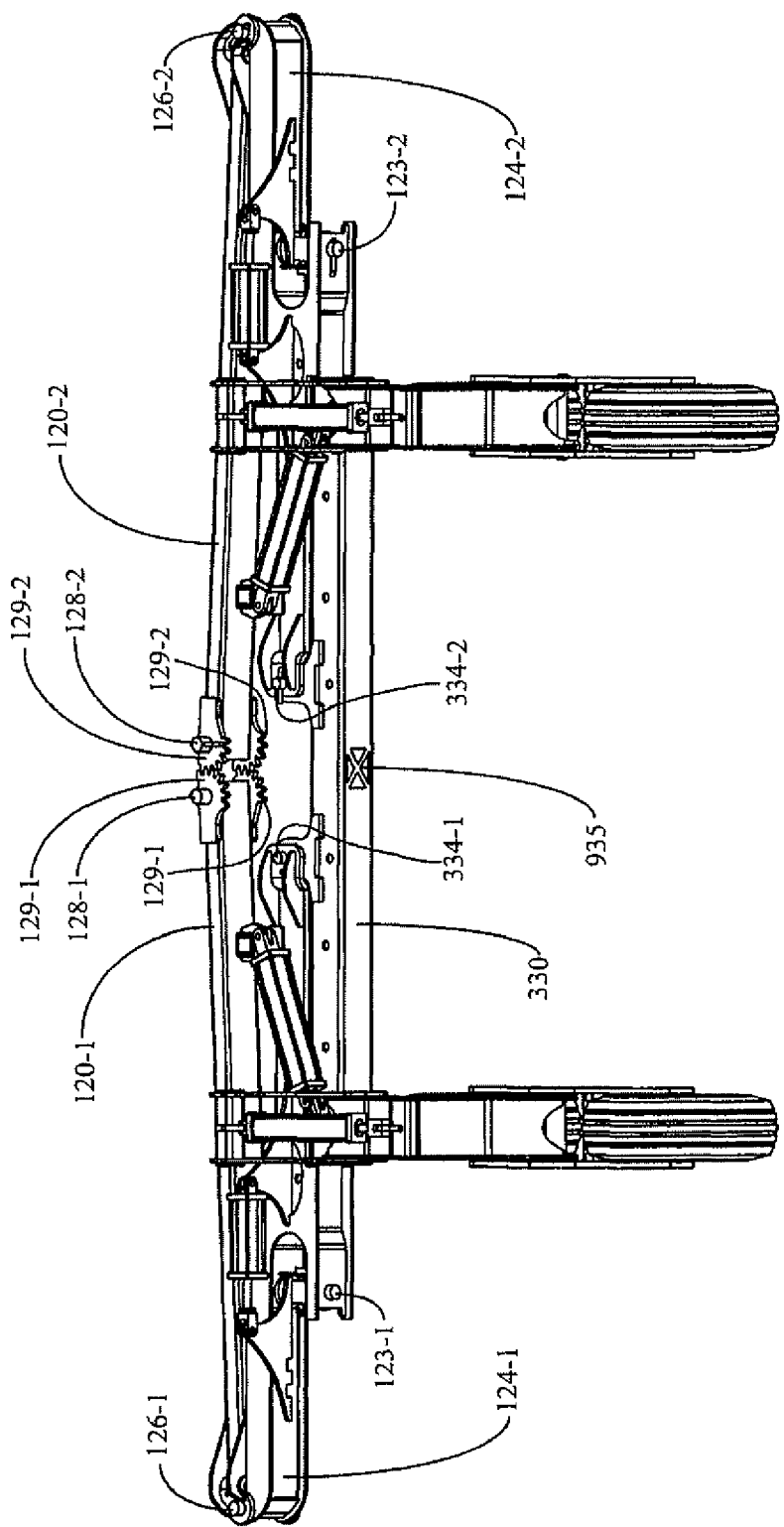
FIG. 7 is a partial rear perspective view of an embodiment of the agricultural toolbar of FIG. 1 with certain components removed to illustrate folding synchronization gears.
Figure 9:
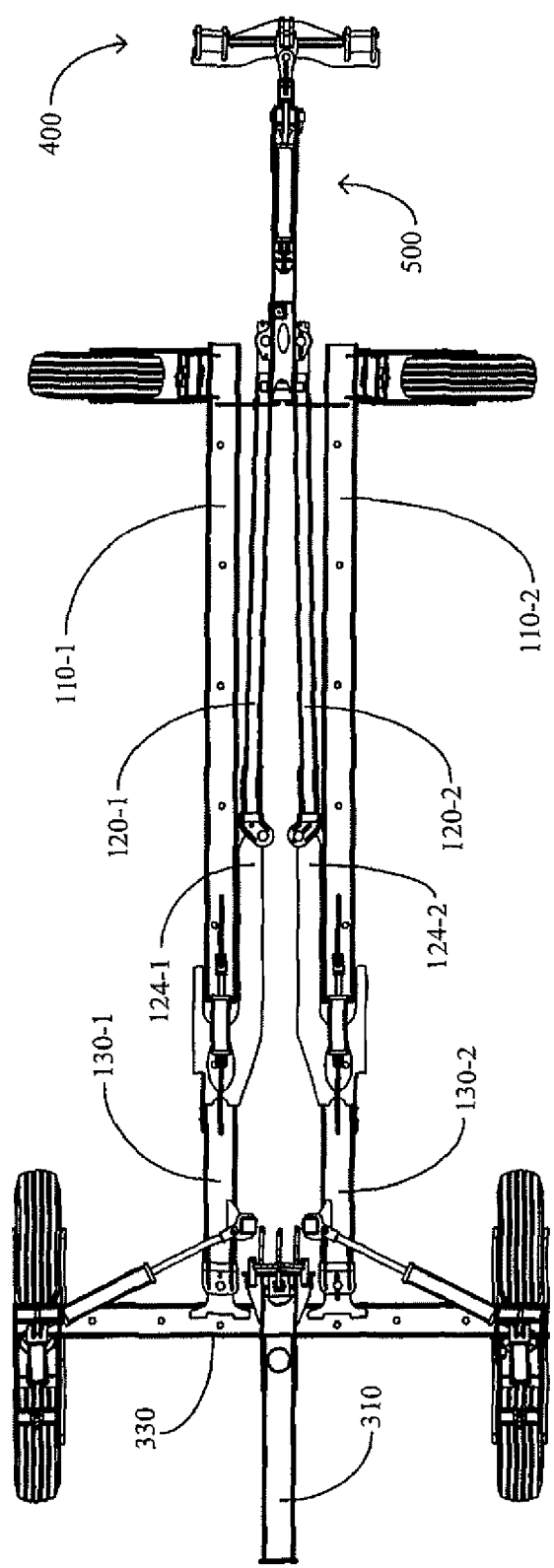
FIG. 9 is a top view of an embodiment of the agricultural toolbar of FIG. 1 in a transport position.

Referring to FIG. 7, in which a portion of the toolbar 10 is illustrated with a proximal portion of the draft tubes 120 removed, each draft tube 120 includes upper and lower gears 129 pivotally connected to the weight transfer assembly 500 by pins 128. The left gears 129-1 are complementary to and operably engaged with right gears 129-2. As the draft tubes 120 rotate between the transport and field position, the left and right gears 129-1, 129-2 remain operably engaged because the pins 128 are held at a fixed relative lateral distance by their connection to the weight transfer assembly 500. The operable engagement of the gears 129-1, 129-2 constrains the gears 129-1 to rotate by an equal and opposite angle about the pin 128-1 as an angle by which the gears 129-2 rotate about the pin 128-2, and vice versa. Thus the gears 129 constrain the draft tubes 120 to pivot synchronously and symmetrically about a vertical longitudinal plane such that the angles between each of the draft tubes 120-1, 120-2 and the weight transfer frame 510 remain substantially equal and opposite throughout folding and unfolding operations, and such that the angles between each of the inner wing sections 130-1, 130-2 and the center bar 330 remain substantially equal and opposite throughout folding and unfolding operations. It should be appreciated that the synchronizing cooperation of the gears 129 cause the toolbar 10 to retain substantially symmetrical configuration about a vertical longitudinal plane defined by the weight transfer frame 510. In other embodiments of the toolbar 10, the inner wing sections 130 are provided with complementary and operably engaged gears mounted to inner ends of the inner wing sections such that the inner wing sections are constrained to rotate about equal and opposite angles relative to the center bar 330 as the toolbar folds. In other embodiments of the toolbar 10, the gears are replaced with other synchronization mechanisms also configured to operably engage left and right members of the toolbar in order to constrain the toolbar 10 to retain a symmetrical configuration during folding and unfolding.

Figure 3:
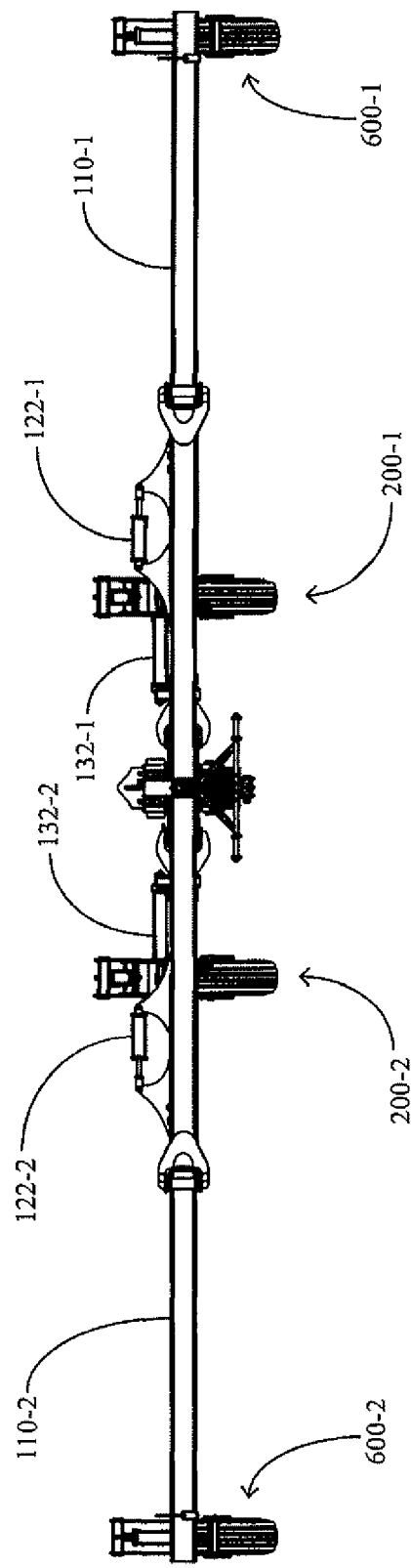
FIG. 3 is a front elevation view of an embodiment of the agricultural toolbar of FIG. 1.

Referring to FIGS. 2 and 3, wing fold actuators 132 are mounted to the toolbar 10 and are preferably configured to fold the toolbar between the field and transport positions described herein; specifically, the wing fold actuators 132 are preferably configured to rotate the inner wing sections 130 forward and away from the center bar 330 as the actuators 132 extend. Each actuator 132 is pivotally mounted at a first end to one of the inner wing sections 130 and pivotally mounted at a second end to one of the distal ends of the center bar 330. Wing flex actuators 122 are mounted to the toolbar 10 for shifting weight between the inner and outer wing sections 130, 110. Each actuator 122 is pivotally mounted at a first end to a distal end of the inner wing section 130 and pivotally mounted at a second end to a proximal end of the outer wing section 110.

Figure 4:
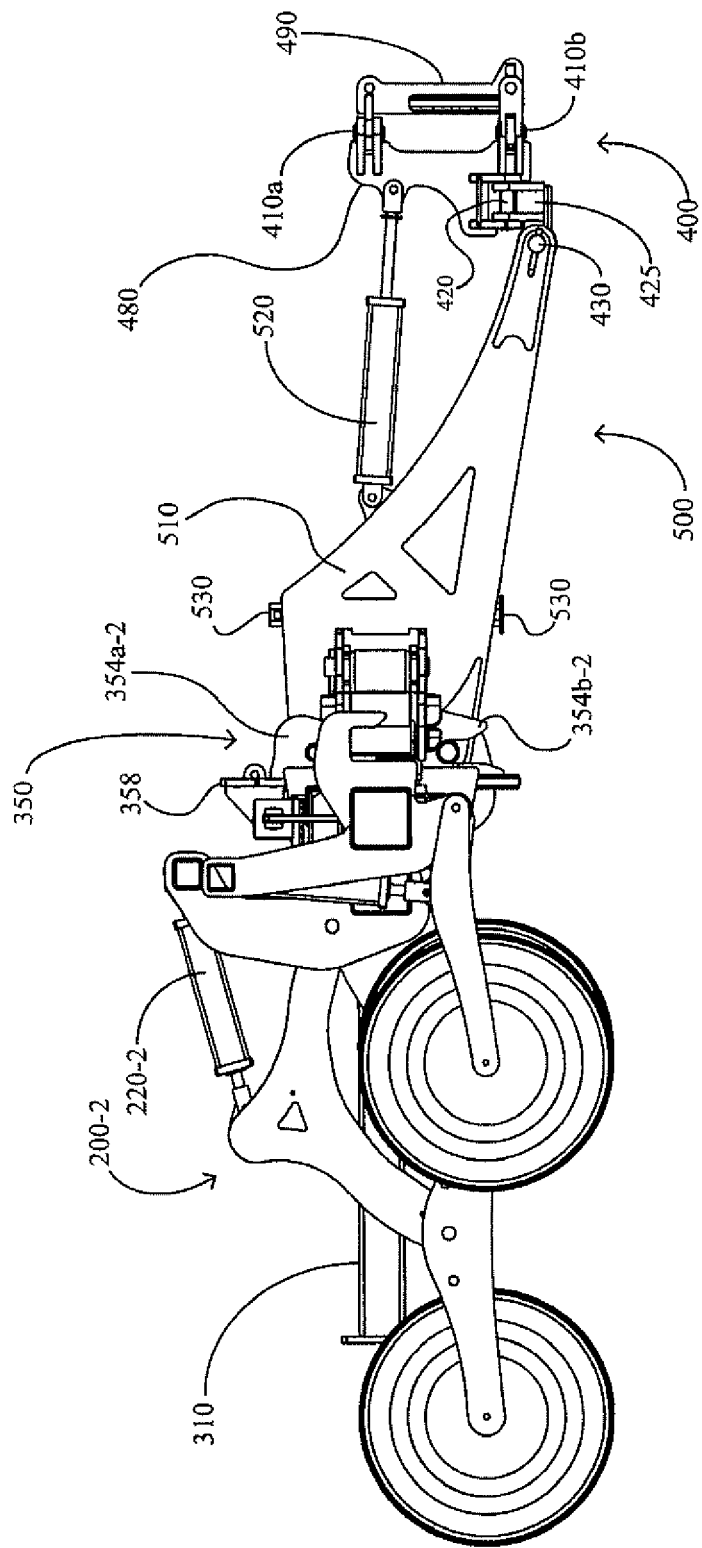
FIG. 4 is a right elevation view of an embodiment of the agricultural toolbar of FIG. 1.
Figure 5:
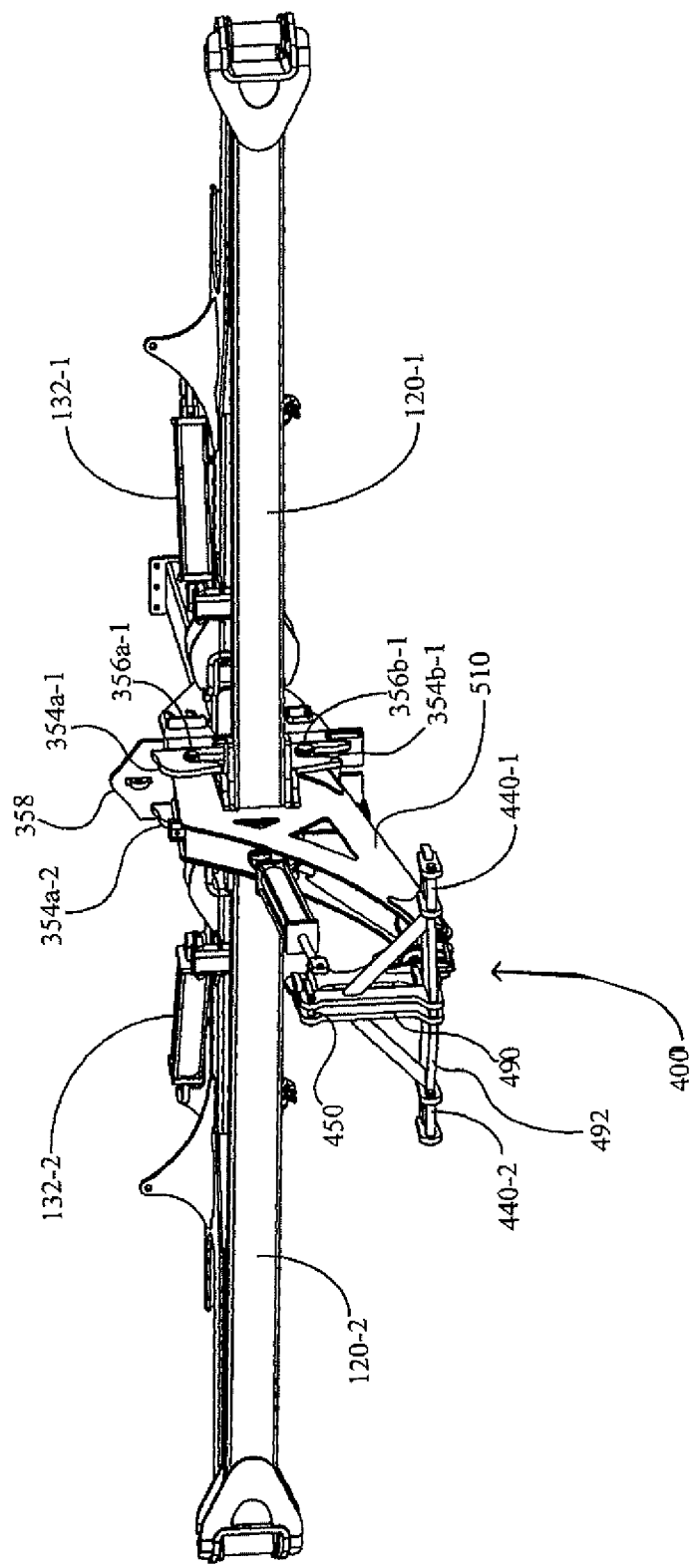
FIG. 5 is a partial front perspective view of an embodiment of the agricultural toolbar of FIG. 1.
Figure 6:
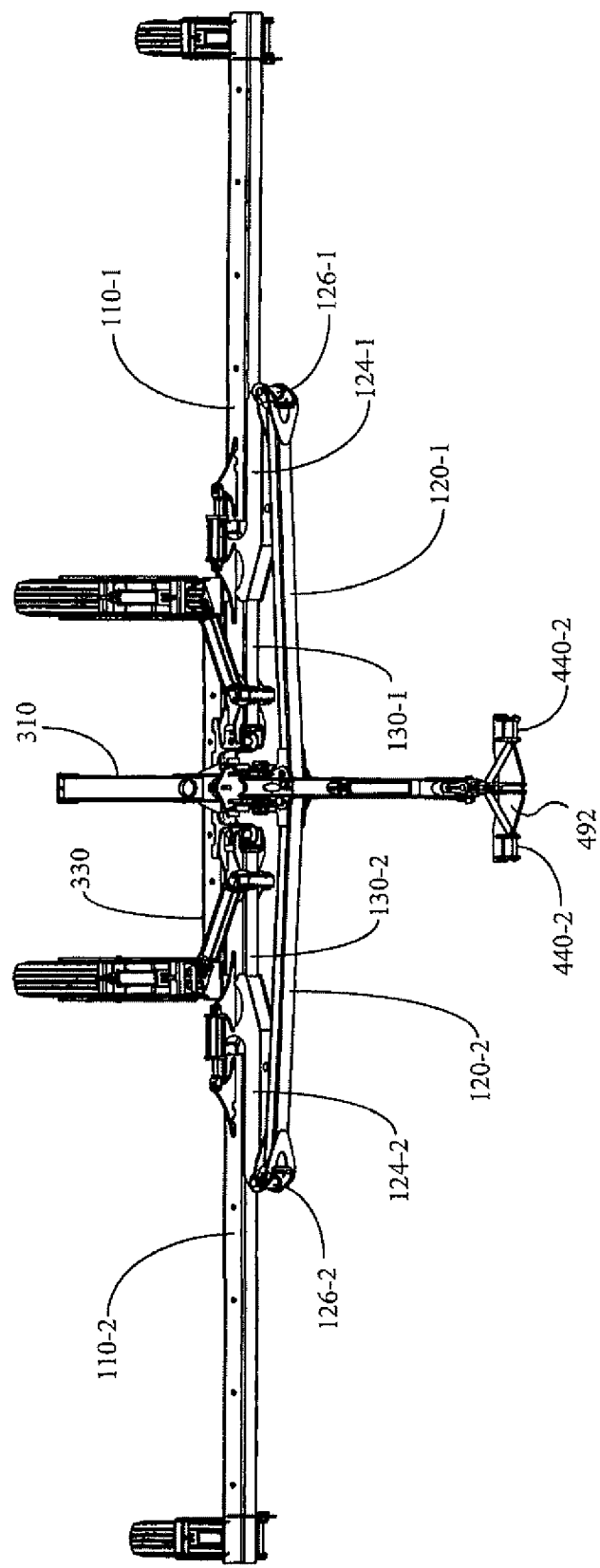
FIG. 6 is a front perspective view of an embodiment of the agricultural toolbar of FIG. 1.

Referring to FIGS. 4, 5, and 6, the hitch assembly 400 includes mounting points 440 configured for attachment to the draft links of a tractor and a mounting point 450 configured for attachment to the top hook of a quick-coupler (e.g., that disclosed in U.S. Patent Application Publication 2007/0169951, "Quick coupler hitch operated with single handle," published Jul. 26, 2007, the disclosure of which is hereby incorporated by reference in its entirety) mounted to a tractor three-point hitch. The mounting points 440, 450 are fixed in spaced-apart relation by a hitch tower 490 and a hitch board 492. The mounting points 440-1, 440-2 are preferably configured for attachment to the left and right lower hooks, respectively, of a quick-coupler mounted to a tractor three-point hitch. Each mounting point described herein preferably comprises a pin configured to be engaged by corresponding structure on a quick-coupler of a three-point hitch. In other embodiments, the mounting points are configured to be to be engaged by corresponding structure on a three-point hitch (e.g., in such embodiments the upper mounting point 450 is configured to be coupled to the top link of the three-point hitch and the mounting points 440 are configured to be coupled to the lower links of the three-point hitch).

A joint plate 480 is pivotally mounted to the hitch tower 490 by two pins 410a, 410b. The joint portion 480 pivots with respect to the hitch tower 490 about a generally vertical axis extending through the pins 410a, 410b. The joint plate 480 is pivotally mounted to a lower joint plate 425 by a pin 420. The joint plate 480 pivots with respect to the lower joint plate 425 about a generally longitudinal axis extending through the pin 420. The lower joint plate 425 is pivotally mounted to the weight transfer assembly 500 by a pin 430. The lower joint plate 425 rotates with respect to the weight transfer assembly 500 about a generally horizontal transverse axis extending through the pin 430.

Referring to FIGS. 4 and 5, the weight transfer assembly 500 includes a weight transfer frame 510. A weight transfer actuator 520 is pivotally mounted at a first end to the weight transfer frame 510 and at a second end to the joint plate 480. As illustrated, the weight transfer assembly 500 is preferably configured such that increasing the head-end pressure (i.e., the "lift" pressure) of the weight transfer actuator 520 transfers a portion of the weight of the toolbar 10 to the tractor, while increasing the rod-end pressure (i.e., the "down" pressure) of the weight transfer actuator 520 transfers a portion of the weight of the tractor to the toolbar. Specifically, it should be appreciated that the relative locations of the mounting pivots of the weight transfer actuator 520 enable the weight transfer actuator to create a moment about the pin 430 acting on the weight transfer frame 510. A jack stand 530 extends through the weight transfer frame 510 and is preferably configured for selective lowering to ground contact and vertical support of the toolbar 10.

Figure 10:
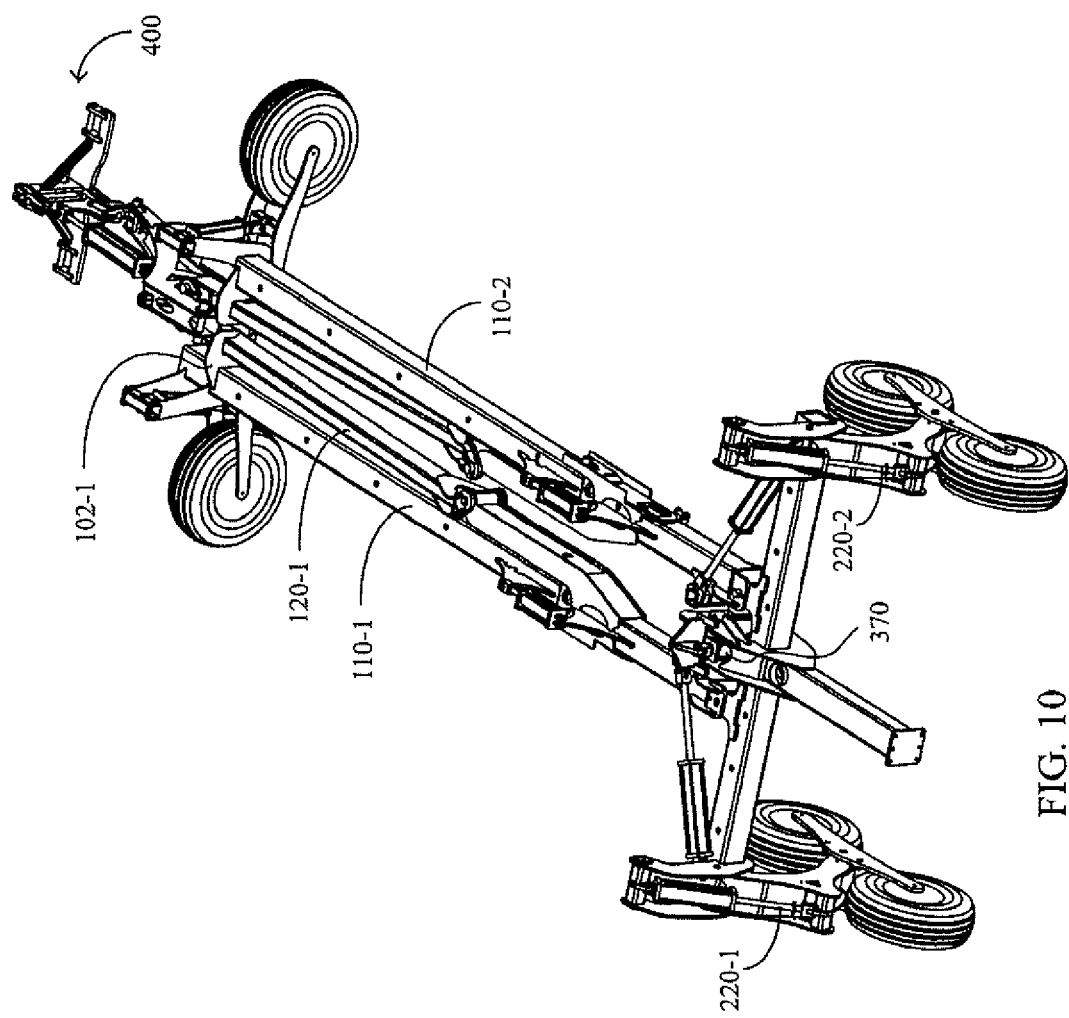
FIG. 10 is a rear perspective view of an embodiment of an agricultural toolbar of FIG. 1 in a transport position.

Again referring to FIGS. 4 and 5, the toolbar 10 includes a latch assembly 350 including a latch plate 358 slidably mounted to the center section 300 for vertical translation with respect to the center section. The latch plate 358 includes upper left and right hooks 354*a*-1, 354*a*-2 which engage upper left and right bars 356*a*-1, 356*a*-2 respectively when the latch plate is in its lowered position. The latch plate 358 includes lower left and right hooks 354*b*-1, 354*b*-2 which engage lower left and right bars 356*a*-1, 356*a*-2 when the latch plate is in its lowered position. The upper bars 356*a* and the lower bars 356*b* are mounted to the weight transfer frame 510 such that when the latch assembly is engaged, the weight transfer assembly 500 is rigidly mounted to the center section 300 and the toolbar 10 is thereby prevented from unfolding to the transport position. Turning to FIG. 10, a latch actuator 370 is mounted at a first end to center section 300 and at a second end to the latch plate 358 for selective raising and lowering of the latch plate and thus for selective engagement and disengagement of the latch assembly 350 when the toolbar 10 is in the field position.

Referring to FIGS. 1 and 10, latches 102 are mounted to distal ends of the outer wing sections 110. In the transport position (FIG. 10), latches 102 engage the draft tubes 120 to prevent the outer wing sections 110 from rotating away from the draft tubes and from pivoting vertically with respect to the draft tubes. The latches 102 thus retain the toolbar 10 in the transport position.

Referring to FIG. 8A, right center wheel assembly 200-2 is mounted to a right distal end of center bar 330. A mounting bar 210 is mounted to the center bar 330 and positioned above the center bar. A center wheel frame 230 is pivotally mounted to the center bar 330 by a transversely extending pin 225. A center wheel actuator 220 is pivotally mounted at a first end to the mounting bar 210 and pivotally mounted at a second end to center wheel frame 230 for selective raising and lowering of the toolbar 10. A wheel frame 240 is pivotally mounted to the center wheel frame 230 about a transverse pin 235. A forward wheel 250 is rollingly mounted to a forward end of the wheel frame 240. A rear wheel 260 is rollingly mounted to a rearward end of the wheel frame 240. In operation, the center wheel assembly rollingly supports the weight of the toolbar 10 and the wheel frame 240 pivots to allow the forward and rear wheels 250, 260 to move up and down relative to one another as the center wheel assembly encounters obstructions or uneven terrain.

Referring to FIG. 8B, right wing wheel assembly 600-2 is mounted to the right distal end of outer wing section 110-2. A mounting bar 610 is mounted to the outer wing section 110 and above and behind the outer wing section. A wing wheel frame 640 is pivotally mounted to the outer wing section 110 by one or more transversely extending pins 635. A wing wheel 650 is rollingly mounted to a rearward end of the wing wheel frame 640. An actuator 620 is pivotally mounted at a first end to mounting bar 610 and pivotally mounted at a second end to wing wheel frame 640 for raising and lowering of the wing section 110. The actuators 220, 620 are preferably dual-acting hydraulic cylinders.

Figure 11A:
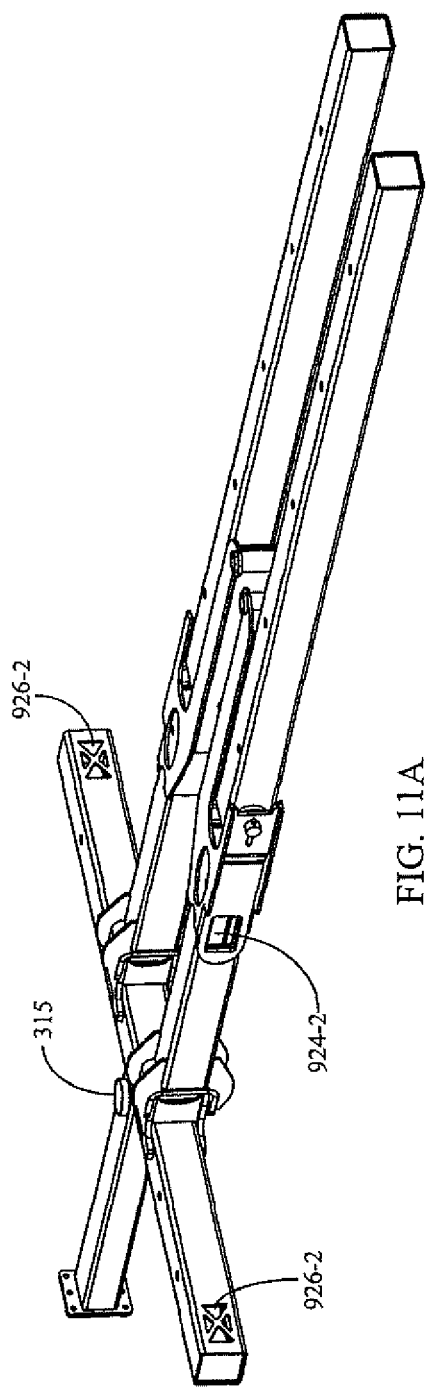
FIG. 11A is a partial front perspective view of an embodiment of an agricultural toolbar having vacuum connection openings.
Figure 11B:
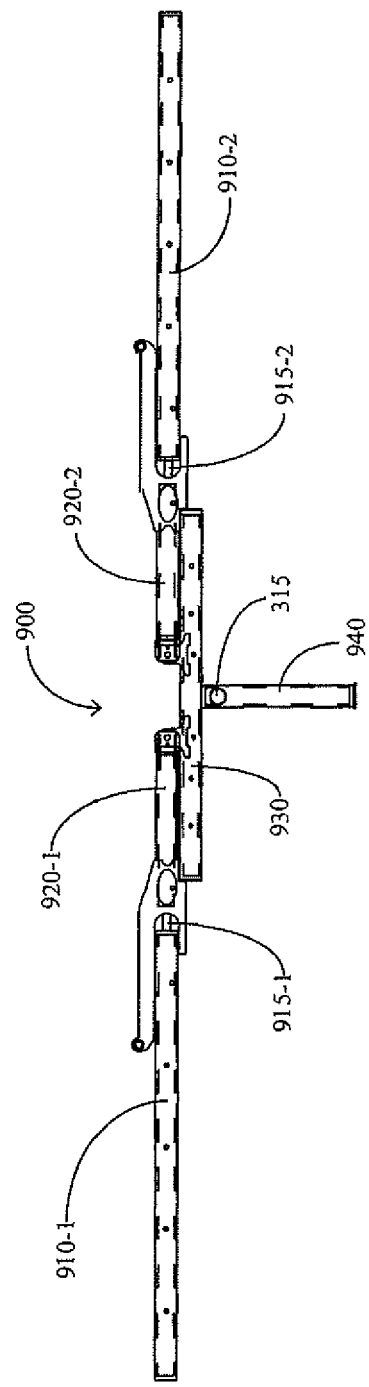
FIG. 11B is a top view of an embodiment of a toolbar vacuum system.

Referring to FIG. 2, the toolbar 10 includes vacuum ports 115 formed outer wing sections 110 at transversely spaced intervals, vacuum ports 335 formed in center bar 330 at transversely spaced intervals, and a vacuum exhaust port 315 formed in the attachment tube 310. A vacuum impeller (not shown) is preferably mounted to the attachment tube 310 and in fluid communication with the vacuum exhaust port 315. Referring to FIG. 11B, attachment tube 310, center bar 330, inner wing sections 130, and outer wing sections 110 have interior volumes 940, 930, 920, 910 respectively. Interior volumes 910 and 920 are in fluid communication via flexible tubes 915. In the field position illustrated in FIG. 11B, interior volumes 930, 920 are in fluid communication via the mating of orifices 924, 926 (FIG. 11A) formed in inner wing sections 120 and center bar 330, respectively. Orifices 924 are each preferably fitted with a resilient seal (not shown) such that the orifices 924 are in resilient fluid connection with orifices 926. Interior volumes 930, 940 are in fluid communication via an orifice 935 (FIG. 7) formed in the center bar 330 and an open forward end of attachment tube 310.

Thus in the field position, the interior volumes 940, 930, 920, 910 form a single interior volume 900 (FIG. 11B). The interior volume 900 comprises a substantially closed volume except for the ports 315,335, 115. Thus the vacuum impeller pulls a sub-atmospheric pressure in the interior volume such that air flows into the ports 335, 115 and out of vacuum exhaust port 315.

Ground-engaging tools such as planter row units, such as those illustrated in U.S. Pat. No. 6,932,236, "Method and apparatus for improving the efficiency of a John Deere vacuum planter," granted Aug. 23, 2005, incorporated herein in its entirety by reference, may be mounted to the center bar 330 and outer wing sections 110. Vacuum meters associated with said row units are preferably in fluid communication with the vacuum ports 115, 335. In other embodiments, other ground-engaging tools such as coulters may be mounted to the center bar 330 and the outer wing sections 110.

Control Systems

Figure 12:
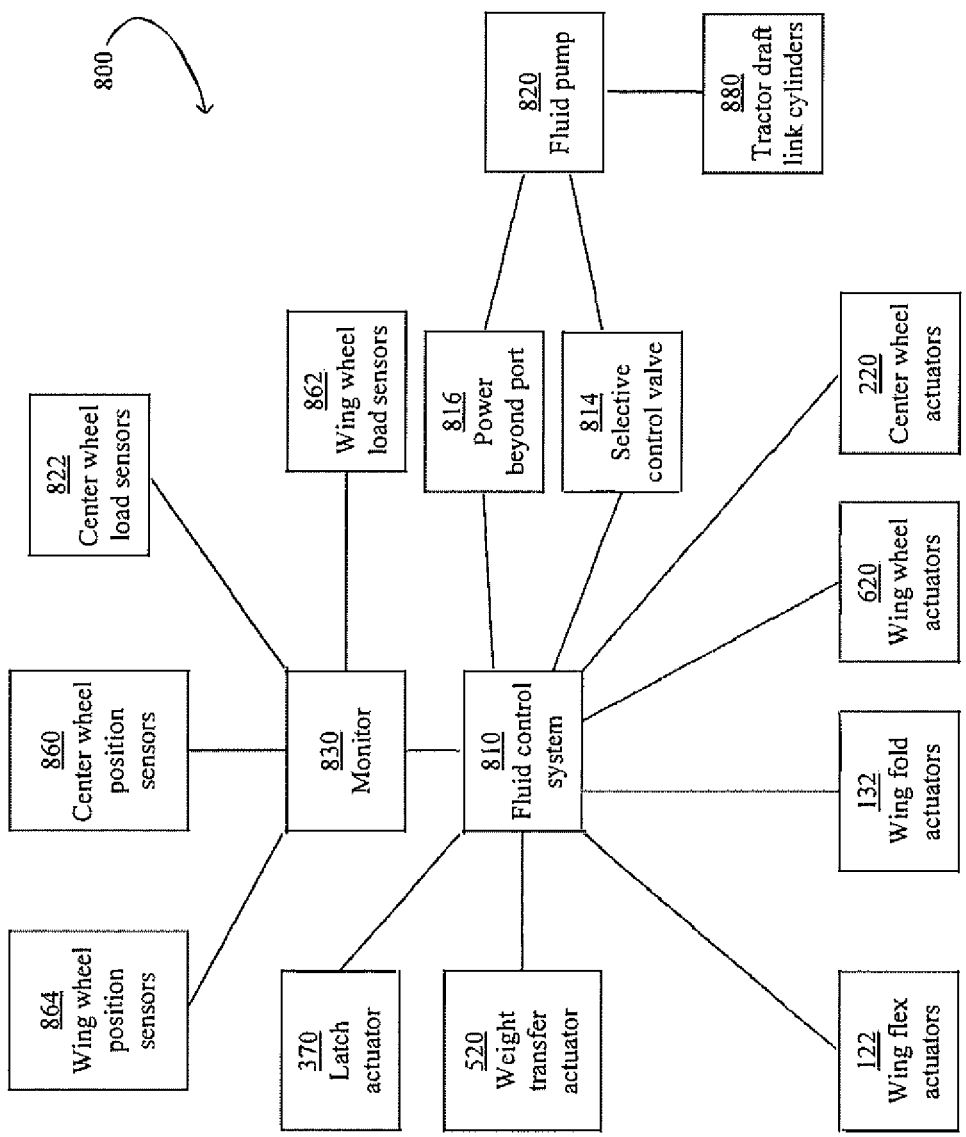
FIG. 12 is a schematic illustration of an embodiment of a control system for an agricultural toolbar.

Referring to FIG. 12, a control system 800 is illustrated including a fluid control system 810 in fluid communication with the latch actuator 370, the weight transfer actuator 520, the wing flex actuators 122, the wing fold actuators 132, the wing wheel actuators 620, and the center wheel actuators 220. The fluid control system 810 is also in fluid communication with a fluid pump 820 via both a power beyond port 816 and a selective control valve 814. The fluid pump 820 is also in fluid communication with the draft link cylinders 880 of the tractor. The fluid pump 820 may comprise a tractor-based hydraulic pump.

The fluid control system 810 preferably comprises a set of electro-hydraulic control valves, each in fluid communication with one or more chambers of the associated actuator. Each control valve includes a solenoid or other electronic control which is in electronic communication with a monitor 830. The monitor 830 includes a central processing unit (CPU), a memory, and a user interface such as a touchscreen graphical user interface. The monitor 830 is also preferably in electrical communication with center wheel position sensors 860, wing wheel position sensors 864, center wheel load sensors 822, and wing wheel load sensors 862.

The center wheel position sensors 860 and wing wheel position sensors 864 preferably comprise Hall-Effect sensors configured to detect the rod extension of the center wheel actuators 220 and the wing wheel actuators 620, respectively. The center wheel load sensors 822-1, 822-2 comprise sensors configured to detect the load carried by the center wheel actuators 220-1, 220-2. Specifically, the center wheel load sensors 822-1, 822-2 may comprise instrumented pins by which the head ends of the center wheel actuators 220-1, 220-2 are mounted to the mounting bars 210-1, 210-2 (see FIG. 8A), such as model number CLP-18k available from Transducer Techniques, Inc. in Temecula, Calif. The wing wheel load sensors 862-1, 862-2 comprise sensors configured to detect the load carried by the wing wheel actuators 620-1, 620-2. Specifically, the wing wheel load sensors 862-1, 862-2 may comprise instrumented pins by which the head ends of the wing wheel actuators 620-1, 620-2 are mounted to the mounting bars 210-1, 210-2 (see FIG. 8B), such as model number CLP-12.5k available from Transducer Techniques, Inc. in Temecula, Calif. In other embodiments, the load sensors 862, 822, may comprise any type of load cell or strain gauge configured to measure the force applied between the ground and the wheel assemblies.

Control Systems—Folding Hydraulics

Figure 16:
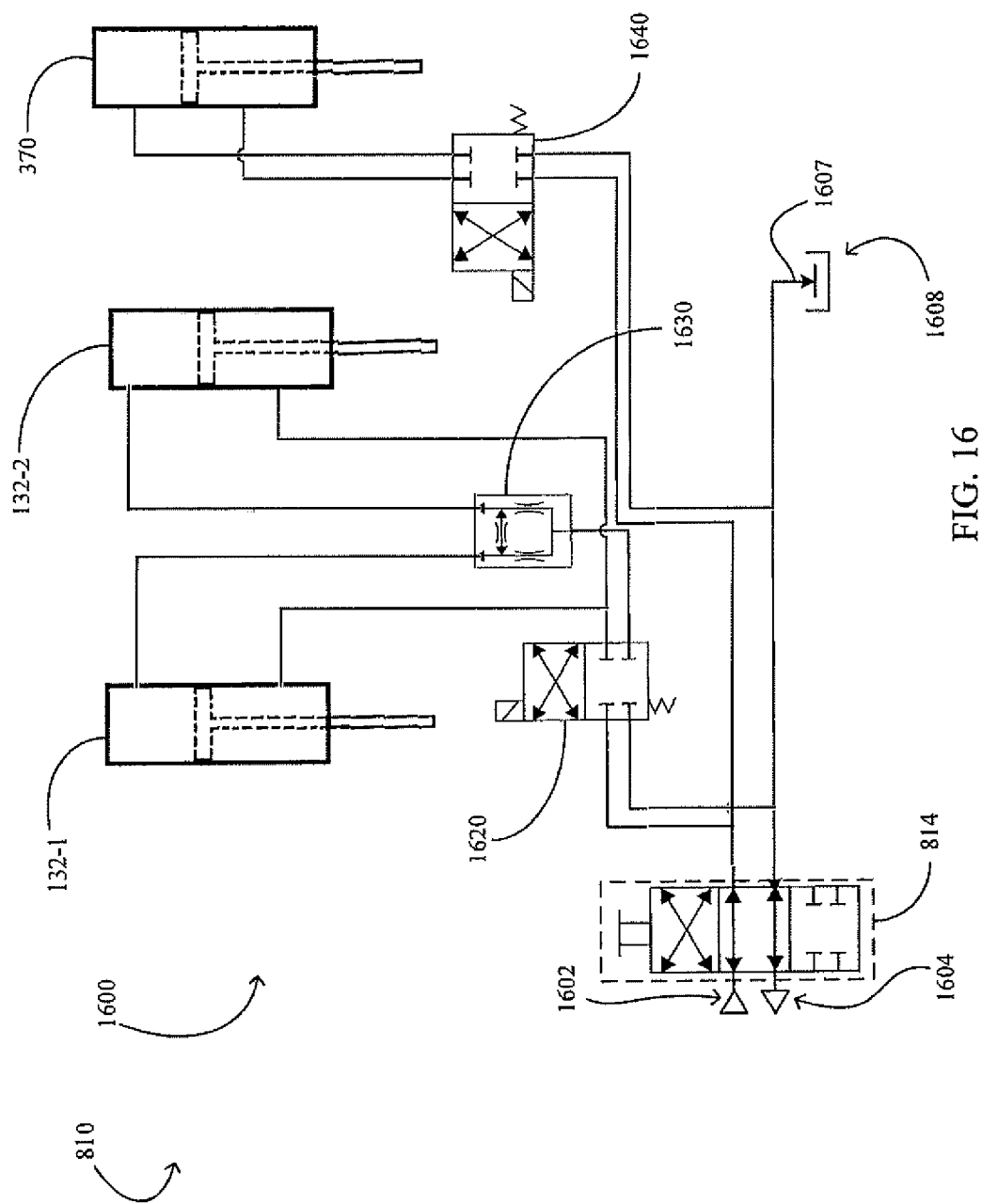
FIG. 16 illustrates an embodiment of a hydraulic circuit for folding an agricultural toolbar.

FIG. 16 illustrates an embodiment of the fluid control system 810 including a folding control system 1600. The folding control system includes a pressurized oil port 1602 and tank port 1604 in fluid communication with the selective control valve 814. The selective control valve 814 is in fluid communication with a case drain 1608 via a small orifice 1607. The selective control valve 814 may comprise a selective control valve such as those included in most commercially available tractors and located in the tractor cab for manual operation by the operator. The selective control valve 814 is in fluid communication with left and right wing fold actuators 132-1, 132-2 via a solenoid-operated directional valve 1620 and a flow divider valve 1630. The monitor 830 is in electrical communication with the directional valve 1620. In operation, the monitor 830 enables wing folding by opening the directional valve 1620. The operator selects the direction of wing folding (i.e., retraction or extension of the wing fold actuators 132) by selecting the position of the selective control valve 814. The flow divider 1630 maintains equal flow between the left and right wing fold actuators 132-1, 132-2, thus synchronizing the folding of the left and right components of the toolbar 10.

The selective control valve 814 is in fluid communication with the latch actuator 370 via a solenoid-operated directional valve 1640. The directional valve 1640 is in electrical communication with the monitor 830. In operation, the monitor 830 enables latch operation by opening the directional valve 1640. The operator selects the direction of latch motion (i.e., extension or retraction of the latch cylinder 370) by selecting the position of the selective control valve 814.

Control Systems—Lift Hydraulics

Figure 17:
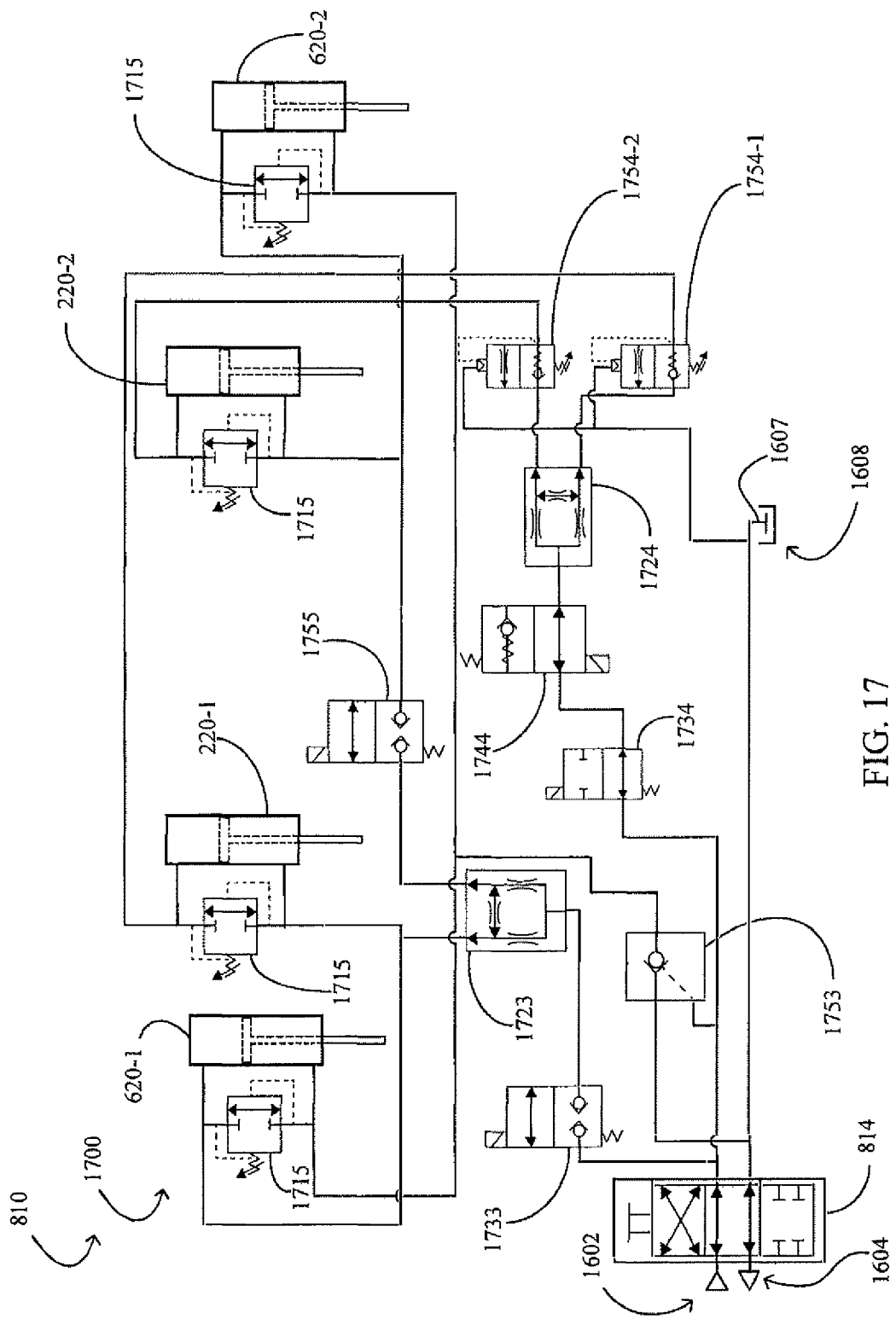
FIG. 17 illustrates an embodiment of a hydraulic circuit for lifting and lowering an agricultural toolbar.

FIG. 17 illustrates an embodiment of the fluid control system 810 including a lift control system 1700. In the lift control system 1700, fluid communication between the actuators 620, 220 and the pressurized oil and tank ports 1602, 1604 is controlled by a pilot operated check valve 1753, a solenoid operated directional valve 1734, a solenoid operated one-way blocking valve 1744, a flow divider valve 1724, counterbalance valves 1754-1, 1754-2, a solenoid operated directional valve 1755, a flow divider valve 1723, and a solenoid operated directional valve 1733.

The solenoid operated directional valve 1734, the solenoid operated one way blocking valve 1744, the solenoid operated directional valve 1755, and the solenoid operated directional valve 1733 are preferably in electrical communication with the monitor 830.

In operation of the control system 1700 in the configuration illustrated in FIG. 17, pressurized oil from the pressurized oil port 1602 flows respectively through the selective control valve 814, the directional valve 1734, the one-way blocking valve 1744, and the flow divider 1724, which separates the oil into two flow paths having substantially equal flow rate. Oil following both flow paths then travels through the counterbalance valves 1754 and to the head ends of the center wheel actuators 220. As oil enters the head ends of the center wheel actuators 220, the center wheel actuators extend such that oil flows from the rod ends of the center wheel actuators. Oil then flows into the head ends of the wing wheel actuators 620, extending the wing wheel actuators such that oil flows from the rod ends of the wing wheel actuators. Oil then flows through the pilot operated check valve 1753, which is opened by pressurized oil in its pilot line, and through the selective control valve 814 to the tank port 1604. Oil is also consistently allowed to bleed into the case drain 1608 through the small orifice 1607. It should be appreciated that in this configuration, the toolbar 10 is raised upward.

In operation of the control system 1700 in the configuration illustrated in FIG. 17 modified in that the selective control valve 814 is in its lowermost (crossing) position, oil flows through the components recited above in the reverse order, such that the center wheel actuators 220 and the wing wheel actuators 620 retract, lowering the toolbar 10 toward the ground.

In other operator-selected configurations of the control system 1700, the wing wheel actuators 620 may be extended and retracted while blocking oil flow to the center wheel actuators 220 by modifying the positions of the valves 1733, 1755, 1744, 1734.

A rephasing valve 1715 is preferably in fluid communication with each of the actuators 620, 220, allowing the actuators to continue extension or retraction if the equivalent actuator on the other side of the toolbar 10 reaches the fully extended or retracted position first.

Control Systems—Weight Management Hydraulics

Figure 18:
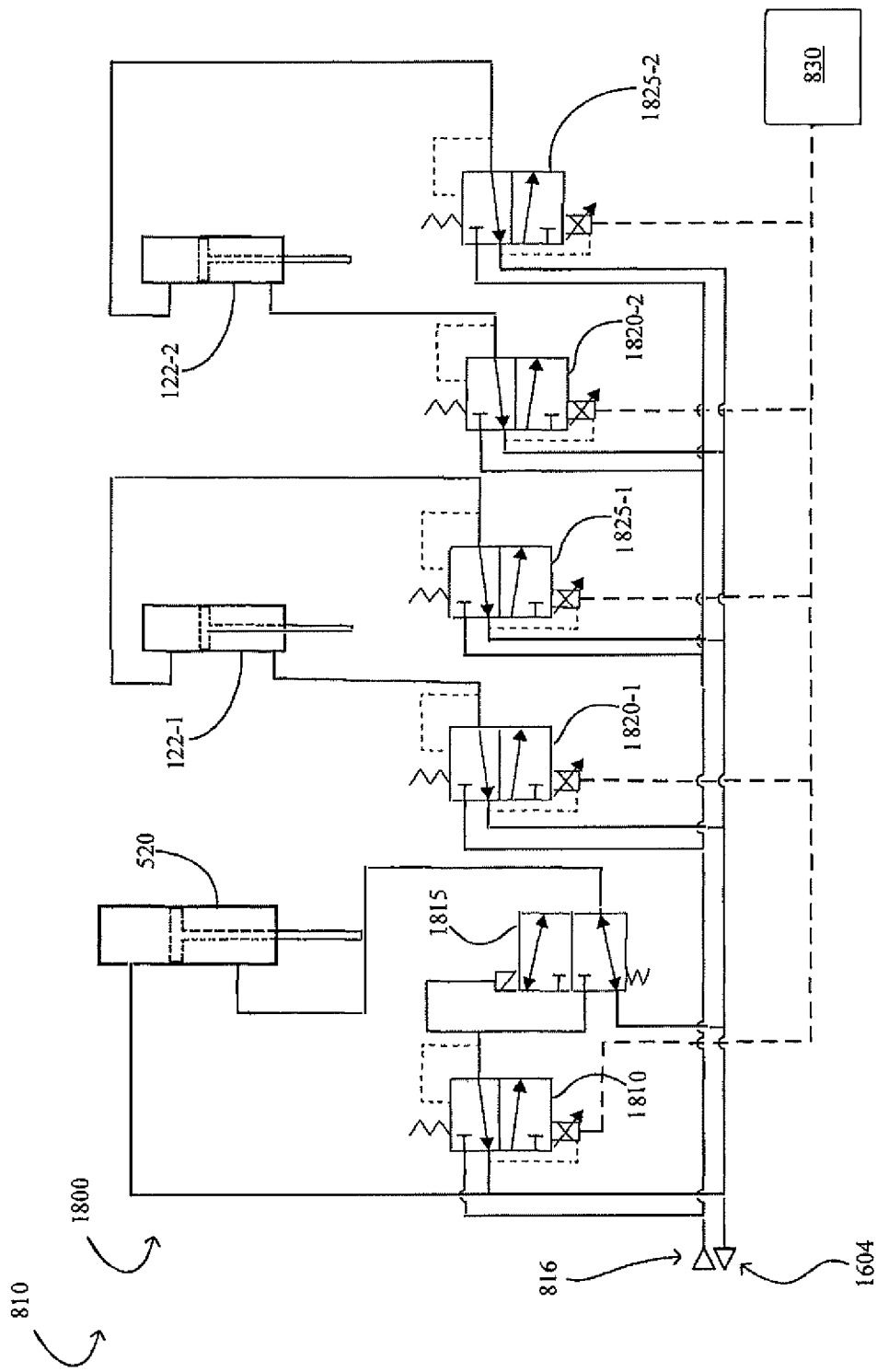
FIG. 18 illustrates an embodiment of a hydraulic circuit for managing the weight of an agricultural toolbar.

FIG. 18 illustrates an embodiment of the fluid control system 810 including a weight management control system 1800. In the weight management control system 1800, the power beyond port 816 and the tank port 1604 are in fluid communication with the rod ends of the right and left wing flex actuators 122-1, 122-2 via solenoid operated pressure reducing-relieving valves 1820-1, 1820-2. The power beyond port 816 and the tank port 1604 are in fluid communication with the head ends of the right and left wing flex actuators 122-1, 122-2 via solenoid operated pressure reducing-relieving valves 1825-1, 1825-2. The valves 1820-1, 1820-2, 1825-1, 1825-2 are in electrical communication with the monitor 830. In operation, the monitor sends a command current to the valves 1820-1, 1820-2, 1825-1, 1825-2 in order to create a desired net pressure (the sum of the head and rod-end pressures) in the wing flex actuators 122-1, 122-2.

The power beyond port 816 and the tank port 1604 are in fluid communication with the rod end of the weight transfer actuator 520 via a solenoid operated pressure reducing-relieving valve 1810 and a pilot operated directional valve 1815. The head end of the weight transfer actuator is in fluid communication with the tank port 1604. The valve 1810 is in electrical communication with the monitor 830. In operation, the monitor 830 sends a command current to the valve 1810 in order to create a desired lift pressure in the weight transfer actuator 520. When the monitor 830 sets the lift pressure to the tank pressure (e.g., 0 psi), the valve 1815 places the rod end of the actuator 520 in fluid communication with the tank port 1604, allowing the rod of the actuator 520 to float.

Figure 19:
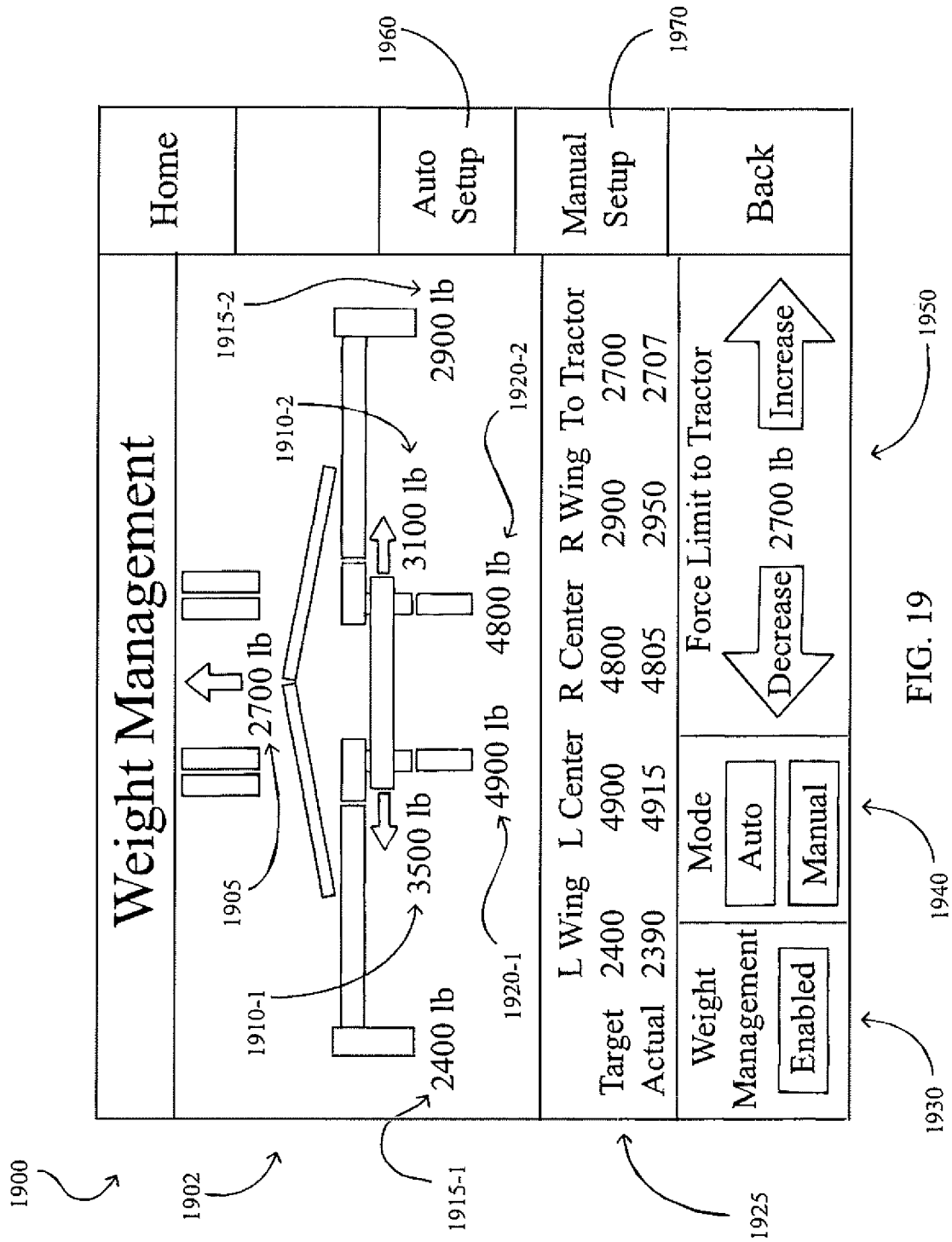
FIG. 19 illustrates an embodiment of a user interface for entering weight management parameters of an agricultural toolbar.

The monitor 830 is preferably configured to allow the operator to select desired weight transfer parameters. A screen 1900 for entering desired weight transfer parameters and displaying actual weight transfer parameters is illustrated in FIG. 19. The screen 1900 includes a graphical weight management window 1902. The window 1902 preferably includes wing load displays 1915-1, 1915-2 which display the loads measured by wing wheel load sensors 862-1, 862-2, respectively. The window 1902 preferably includes center wheel load displays 1920-1, 1920-2 which display the loads measured by center wheel load sensors 822-1, 822-2, respectively. The window 1902 preferably includes a tractor weight transfer display 1905 which displays the net pressure in the weight transfer actuator 520 as well as an arrow indicating the direction of weight transfer. It should be appreciated that the illustrated forward arrow indicates that the net pressure in the actuator 520 is transferring weight from the toolbar 10 to the tractor. The window 1902 preferably includes wing weight transfer displays 1910-1, 1910-2 which display the net pressure in the wing flex actuators 122-1, 122-2, respectively, as well as arrows indicating the direction of weight transfer. It should be appreciated that the illustrated outward arrows indicate that the net pressures in the actuators 122 are transferring weight from the center section 300 to the outer wing sections 110.

The screen 1900 also preferably includes a comparison window 1925. The comparison window 1925 preferably displays the desired ("Target") and measured ("Actual") values of the forces displayed in the window 1902. In alternative embodiments, the comparison window 1925 graphically illustrates the difference between desired and measured weight and pressure values.

The screen 1900 includes a force limit modification window 1950. The window 1950 enables the operator to modify the maximum lift pressure in the weight transfer actuator 520 by pressing the "Increase" and "Decrease" arrows. The window 1950 also preferably displays the current maximum lift pressure.

The screen 1900 also preferably includes an enablement window 1930. When the operator presses the enablement window 1930, the monitor 830 cycles between "Enabled" and "Disabled" modes. In the "Enabled" mode, the monitor 830 controls the pressures in the weight transfer actuator 520 and wing flex actuators 122 as described herein. In the "Disabled" mode, the monitor 830 sends a command current to the valves 1810, 1820, 1825 corresponding to the tank line pressure (e.g., 0 psi), placing the actuators 520, 122 in a float mode.

The screen 1900 also preferably includes a control mode selection window 1940. The window 1940 enables the operator to choose between control modes (described later herein) by selecting either the "Auto" or "Manual" buttons.

Figure 20:
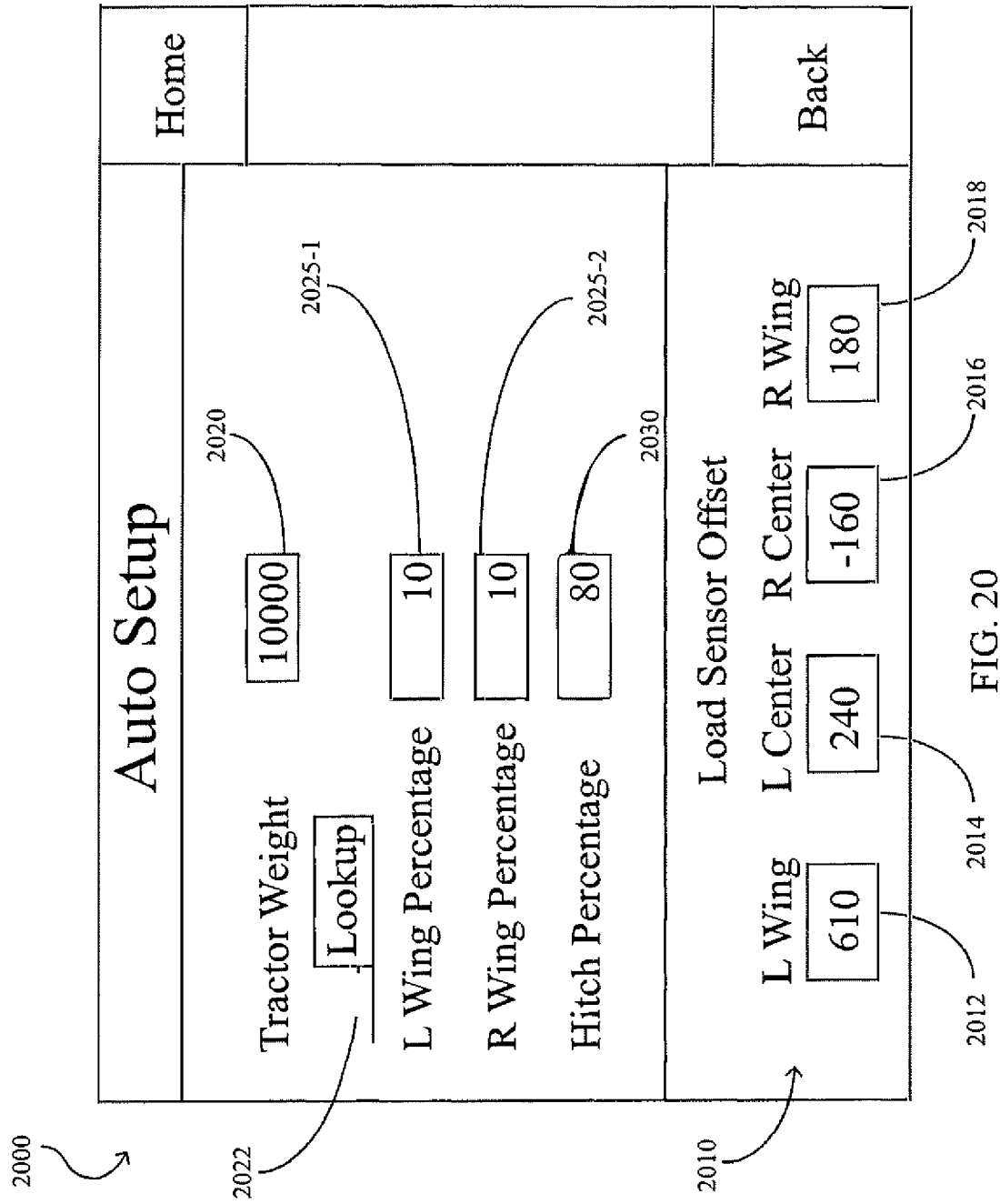
FIG. 20 illustrates another embodiment of a user interface for entering weight management parameters of an agricultural toolbar.

The operator may enter desired parameters corresponding to the "Auto" control mode by selecting an automatic mode setup window 1960 in the screen 1900. Selection of the window 1960 preferably opens the automatic mode setup screen 2000 illustrated in FIG. 20. The screen 2000 includes a tractor rear weight field 2020 allowing the operator to enter an estimated tractor weight carried by the rear tires or track portions of the tractor, i.e., the desired sum of the measured loads on the center wheel assemblies 200. The screen 2000 includes a hitch percentage field 2030 allowing the operator to enter a hitch weight transfer percentage, i.e., a related to the amount of toolbar weight to be transferred to the tractor by a corresponding increase in lift pressure in the weight transfer actuator 520. The screen 2000 includes wing percentage fields 2025 for entering wing weight transfer percentages, i.e., a parameter related to the amount of center section weight to be transferred to the wing wheels 650 by a corresponding increase in head pressure in the wing flex actuators 122. The screen 2000 preferably includes a calibration offset window 2010 including fields 2012, 2014, 2016, 2018 for entering calibration offsets associated with the load sensors 862-1, 822-1, 822-2, 862-2, respectively.

Figure 22:
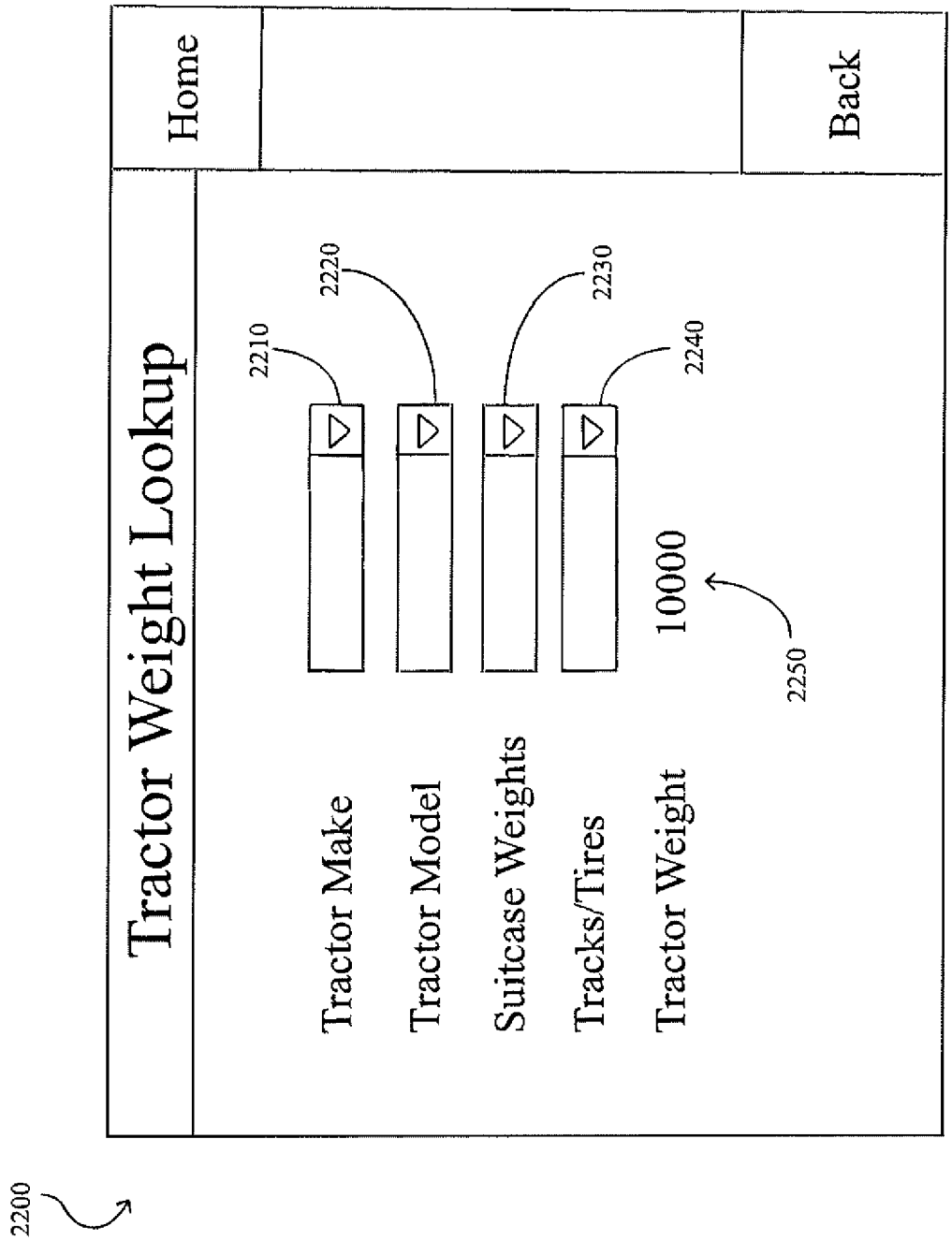
FIG. 22 illustrates an embodiment of a user interface for looking up a tractor weight.

Rather than entering an estimated weight in field 2020, the operator may press the lookup button 2022. Pressing the lookup button 2022 preferably opens a lookup screen 2200 as illustrated in FIG. 22. The lookup screen 2022 includes drop-down fields 2210, 2220, 2230, 2240 for selecting tractor criteria such as tractor make, tractor model, the total weight of any suitcase weights mounted to the tractor, and track or tire types, respectively. The monitor 830 is preferably configured to use a lookup table stored in memory to correlate a combination set of tractor criteria with an estimated tractor weight carried by the rear tires or track portions of the tractor. The monitor 830 preferably displays the looked-up estimated weight in a display field 2250. When the operator returns to the screen 2000, the monitor 830 preferably automatically enters the estimated weight in the field 2020.

The operator may enter desired parameters corresponding to the "Manual" control mode by selecting a manual mode setup window 1970 in the screen 1900. Selection of the window 1970 preferably opens the manual mode setup screen 2100 illustrated in FIG. 21. To set the control mode of the wing flex actuators 122, the operator may select either a "Command" mode or a "Feedback" mode by selection of buttons 2110 or 2120, respectively. If the "Command" mode is selected, the operator may enter commanded pressures into left wing flex actuator 122-1, right wing flex actuator 122-2 and weight transfer actuator 520 into fields 2112, 2114, 2116 respectively. If the "Feedback" mode is selected, the operator may enter desired loads on left wing wheel 650-1 and right wing wheel 650-2 into fields 2122, 21124, respectively, and a desired sum of loads on center wheel assemblies 200 into field 2126.

Control Methods
Control Methods—Toolbar Configurations

The fluid control system 810 controls the wing fold actuators 132 in a flow control mode. In response to a command entered into the monitor 830 or manipulation of the selective control valve 814, the fluid control system 810 extends and retracts the wing fold actuators 132 in order to reconfigure the toolbar 10 into its transport position and field position, respectively.

The fluid control system 810 controls the wing wheel actuators 620 and the center wheel actuators 220 in a flow control mode. In response to a command entered into the monitor 830 or manipulation of the selective control valve 814, the fluid control system 810 extends or retracts the wing wheel actuators 620 and the center wheel actuators 220 between several operative positions. The operative positions of the wheel actuators 620 and the center wheel actuators 220 include a field position, a more retracted transport position, and an end-of-row turning position between the field position and the transport position.

Figure 23B:
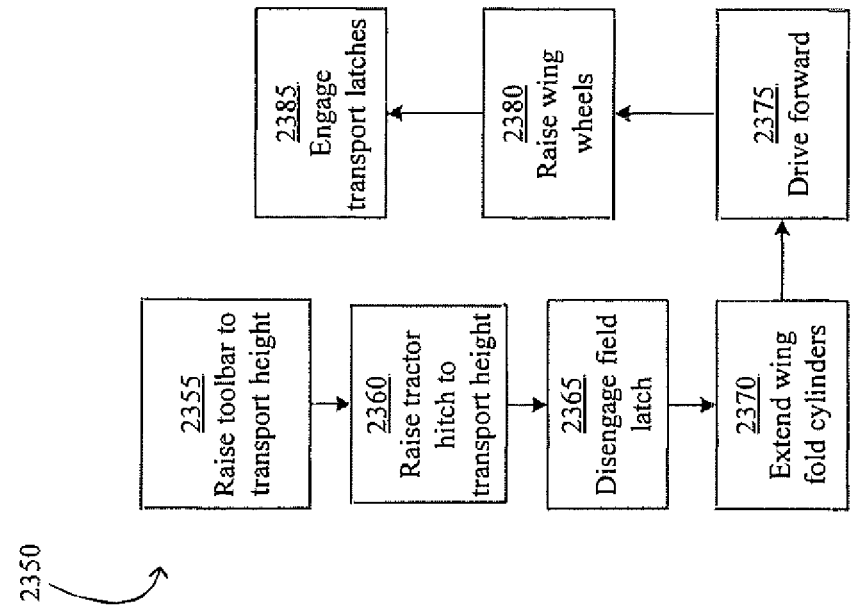
FIG. 23B illustrates an embodiment of a process for folding an agricultural toolbar from a field position to a transport configuration.
Figure 23A:
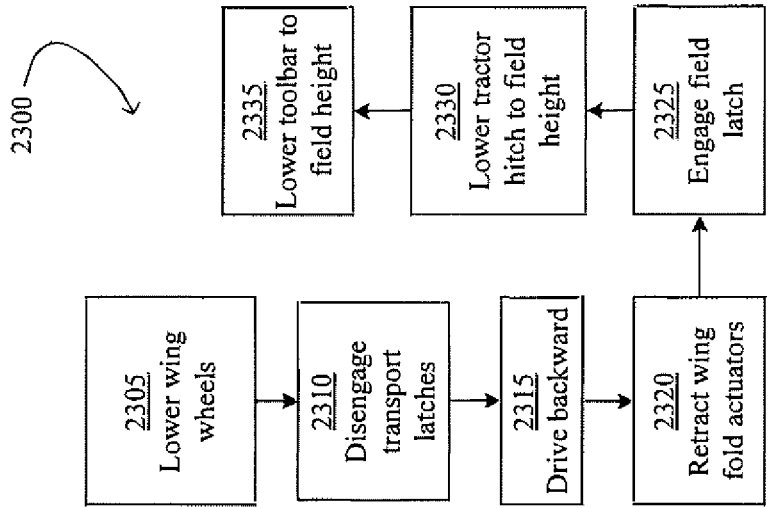
FIG. 23 A illustrates an embodiment of a process for folding an agricultural toolbar from a transport configuration to a field position.

A process 2300 for unfolding the toolbar from the transport position to the field position is illustrated in FIG. 23A. At step 2305, the monitor 830 preferably commands the fluid control system 810 to lower the wing wheels 600 by extending the wing wheel actuators 620. At step 2310, the latches 102 are disengaged as the wing wheels 600 raise the wing sections 110 relative to the draft tubes 120. At step 2315, the operator preferably drives the tractor backward or allows the tractor to roll backward. At step 2320, the monitor 830 preferably commands the fluid control system 810 to retract the wing fold actuators 132. At step 2325, the monitor 830 preferably commands the fluid control system 810 to engage the latch assembly 350 by retracting the latch actuator 370. At step 2330, the operator preferably lowers the tractor three-point hitch to a lowered field position. At step 2335, the monitor 830 preferably commands the fluid control system to lower the toolbar 10 to a lowered field height by fully retracting the center wheel actuators 220 and wing wheel actuators 620.

A process 2350 for folding the toolbar from the field position to the transport position is illustrated in FIG. 23B. At step 2355, the monitor preferably commands the fluid control system to raise the toolbar 10 to a raised transport height by fully extending the center wheel actuators 220 and wing wheel actuators 620. At step 2360, the operator preferably raises the tractor three-point hitch to a raised transport height. At step 2365, the monitor 830 preferably commands the fluid control system 810 to disengage the latch assembly 350 by extending the latch actuator 370. At step 2370, the monitor 830 preferably commands the fluid control system 810 to extend the wing fold actuators 132. At step 2375, the operator preferably drives the tractor forward or allows the tractor to roll forward. At step 2380, the monitor 830 preferably commands the fluid control system to raise the wing wheels 600 by retracting the wing wheel actuators 620. At step 2385, the latches 102 are engaged as the wing wheels 600 lower the wing sections 110 relative to the draft tubes 120.

The monitor 830 is preferably configured to raise the toolbar from the field position to an end-of-row turn configuration by simultaneously extending the center wheel actuators 220 and the wing wheel actuators 620 until a predetermined signal is received from either or both of the wing wheel position sensors 864 or the center wheel position sensors 860. The monitor 830 is also preferably configured to return the toolbar from the end-of-row turn configuration to the field position by fully retracting the wing wheel actuators 620.

Control Methods—Weight Management

The fluid control system 810 preferably controls the weight transfer actuator 520 and the wing flex actuators 122 in a pressure control mode. Several methods of weight management (i.e., shifting vertical loads between the tractor, the center section 300, and the wing sections 110) using the weight transfer actuator 520 and the wing flex actuators 122 are disclosed herein. It should be appreciated that in each mode, the monitor 830 commands the desired pressures by sending command signals to the pressure reducing-relieving valves associated with the actuators 122, 520.

Control Methods—Weight Management—Command-Based Mode

In a command-based weight management mode, the monitor 830 commands the constant pressures entered in fields 2112, 2114, 2116 of the manual mode setup screen 2100 (FIG. 21) to the actuators 122-1, 122-2, 520 respectively. When a positive value is entered into either of the fields 2112, 2114, the monitor 830 preferably commands pressures of corresponding magnitude to the wing flex actuator chambers tending to extend the corresponding wing flex actuator 122 (thus shifting weight from the center section 300 to wing sections 110-1, 110-2). When a negative value is entered into either of the fields 2112, 2114, the monitor 830 preferably commands pressures of corresponding magnitude to the wing flex actuator chambers tending to retract the corresponding wing flex actuator 122 (thus shifting weight from wing sections 110-1, 110-2 to the section 300).

Control Methods—Weight Management—Feedback—Based Mode

Figure 21:
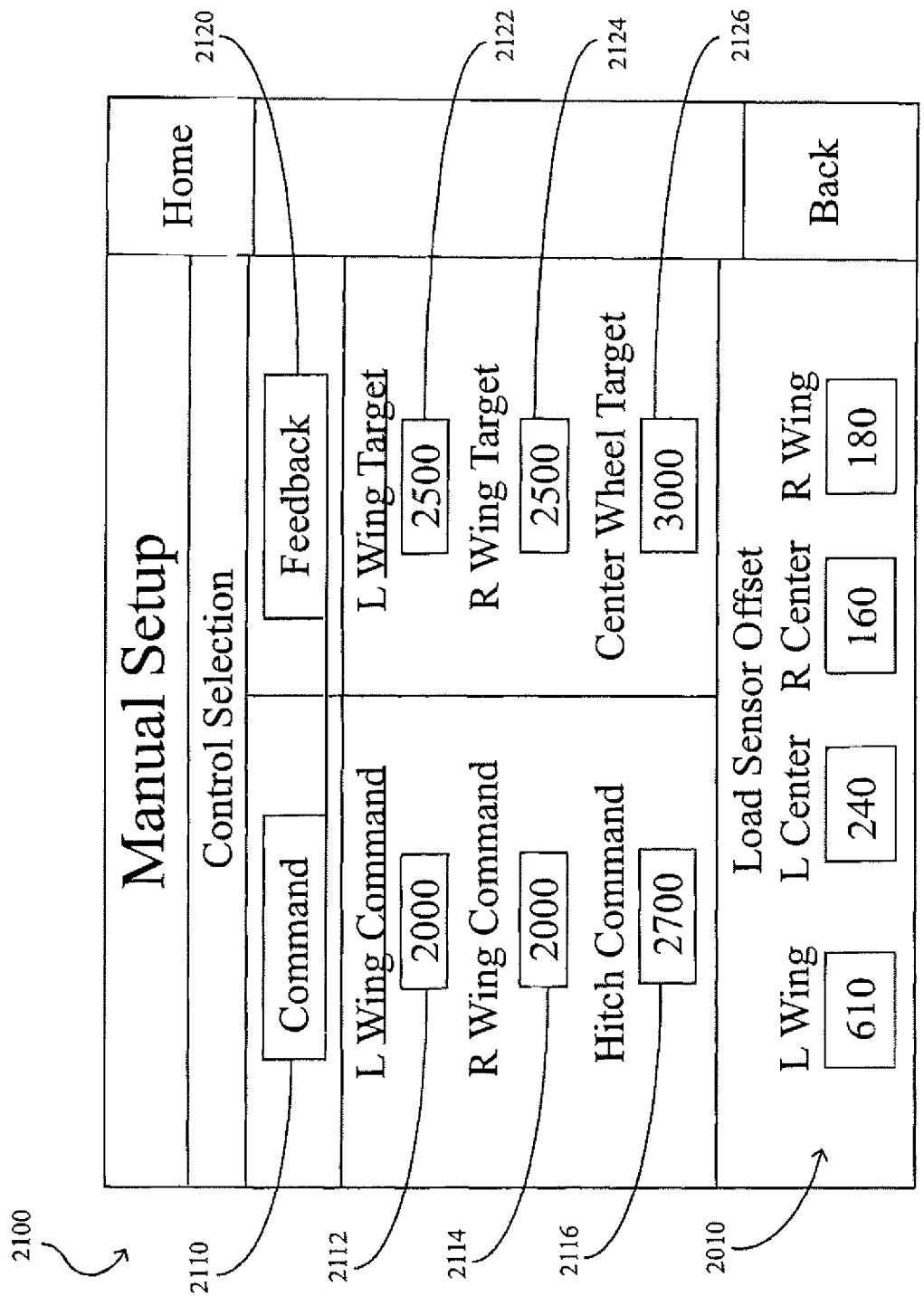
FIG. 21 illustrates another embodiment of a user interface for entering weight management parameters of an agricultural toolbar.

In a feedback-based weight management mode, the monitor 830 commands pressures to the actuators 520, 122-1, 122-2 based on desired ranges of measured loads on the center wheel assemblies 200, wing wheel 600-1, and wing wheel 600-2. The desired ranges of measured loads are preferably based on targets entered by the operator in fields 2126, 2122, 2124 of the manual mode setup screen 2100 (FIG. 21). For example, each desired range may comprise a range between 95% and 105% of each target value. In other embodiments, one or more desired ranges are predetermined and saved in the memory of the monitor 830. In some embodiments, the monitor selects from multiple predetermined desired ranges depending upon one or more variable operating parameters (e.g., tractor speed).

Figures 13A, 13B:
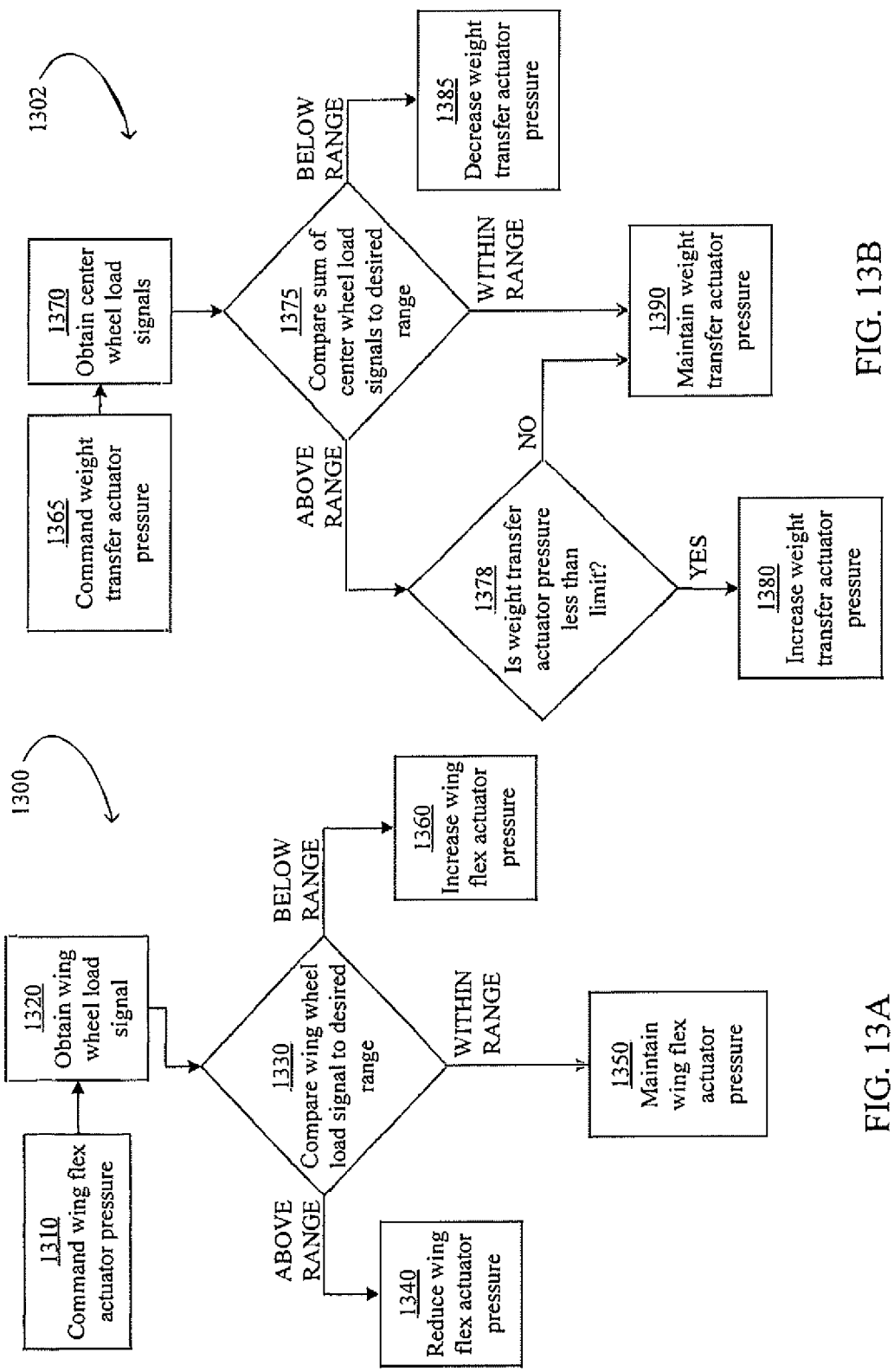
FIG. 13A illustrates an embodiment of a process for controlling wing flex actuators of an agricultural toolbar.
FIG. 13B illustrates an embodiment of a process for controlling a weight transfer actuator of an agricultural toolbar.

A wing flex actuator control process 1300 for controlling each wing flex actuator 122 in a feedback-based mode is illustrated in FIG. 13A. At step 1310, the monitor 830 preferably commands an initial pressure to the wing flex actuator 122. At step 1320, the monitor 830 preferably receives a wing wheel load signal from the wing wheel load sensor 862 associated with the same wing section 110 as the wing flex actuator 122. At step 1330, the monitor 830 preferably compares the wing wheel load signal to a desired range determined as discussed above. If the wing wheel load signal is above the desired range, then the monitor reduces the commanded wing flex actuator pressure at step 1340. If the wing wheel load signal is below the desired range, then the monitor increases the commanded wing flex actuator pressure at step 1360. If the wing wheel load signal is within the desired range, then the monitor maintains the previously commanded wing flex actuator pressure at step 1350.

A weight transfer actuator control process 1302 for controlling the weight transfer actuator 520 in a feedback-based mode is illustrated in FIG. 13B. At step 1365, the monitor 830 preferably commands an initial lift pressure to the weight transfer actuator 520. At step 1370, the monitor 830 preferably receives signals from both center wheel load sensors 822. At step 1375, the monitor 830 preferably compares the sum of the center wheel load signals to a desired range determined as discussed above. If the load signal sum is below the desired range, then the monitor reduces the commanded weight transfer actuator pressure at step 1385. If the load signal sum is within the desired range, then the monitor maintains the previously commanded weight transfer actuator pressure at step 1390. If the load signal sum is above the desired range, then at step 1378 the monitor 830 preferably compares the current weight transfer actuator pressure to the limit set by the operator by utilizing the force limit modification window 1950 as discussed herein with respect to FIG. 19. If the weight transfer actuator pressure is less than the limit, then the monitor 830 preferably increases the commanded wing flex actuator pressure at step 1380. If the weight transfer actuator pressure is not less than the limit, then the monitor 830 preferably maintains the previously commanded weight transfer actuator pressure at step 1390.

Control Methods—Weight Management—Weight-Balancing Mode

In a weight-balancing weight management mode, the monitor 830 commands pressures to the actuators 520, 122-1, 122-2 based on a desired division of weight between the tractor, the center wheel assemblies 200, and the wing wheels 600. The desired balance of measured loads is preferably based on the values entered in fields 2025-1, 2025-2, 2030 using the screen 2000.

Figure 14:
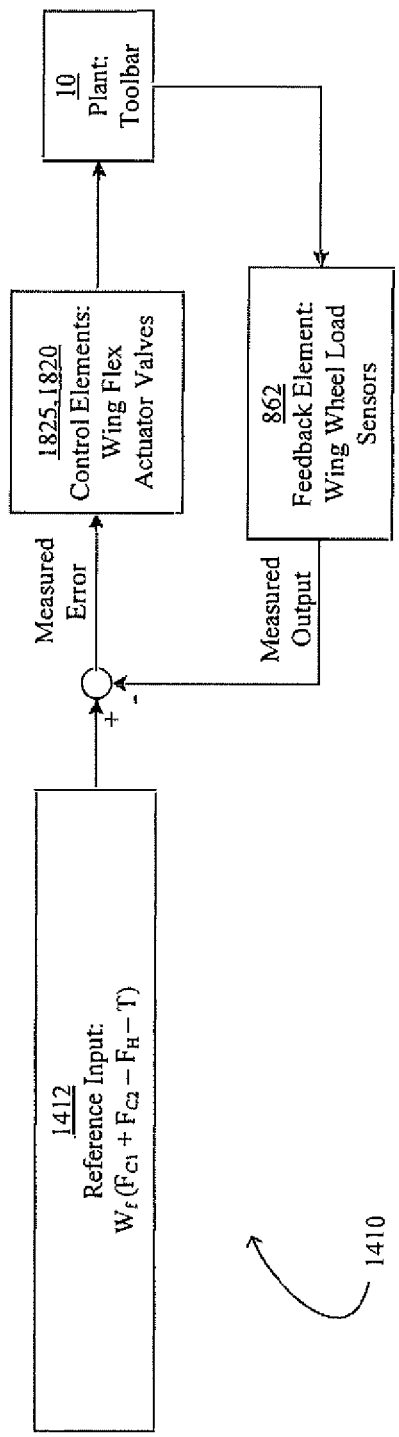
FIG. 14 illustrates an embodiment of a control loop for controlling wing flex actuators of an agricultural toolbar.

A control loop 1410 for controlling each wing flex actuator 122 in a weight-balancing mode is illustrated in FIG. 14. In the control loop, the monitor 830 compares the measured output of the wing wheel load sensor 862 with a reference input 1412 preferably calculated according to the following relation:

$$\text{Reference Input}=W_f(F_{c1}+F_{c2}-F_H-T)$$

Where:

$W_f$ is the wing weight transfer percentage, preferably entered in one of the fields 2025 of the automatic mode setup screen 2000, expressed as a fraction;

Fc1 and Fc2 are the signals from the center wheel load sensors 822-1, 822-2, respectively;

$F_H$ is an estimate of the amount of weight transferred from the toolbar 10 to the tractor, e.g., using a multiplier (related to the effective area over which the cylinder pressure is imposed and the mechanical advantage of the weight transfer assembly 500) of the commanded pressure in the weight transfer actuator 520; and T is the estimated weight on the tractor rear wheels or track portions, either entered by the operator in field 2020 of the automatic mode setup screen 2000 or determined as described herein with respect to FIG. 22.

The monitor 830 adjusts the pressure in control valves 1825, 1820 associated with the wing flex actuator 122 in order to reduce the measured error between the reference input 1412 and the measured output of the wing wheel load sensor 862. The monitor preferably also compares either the commanded wing flex actuator pressure or the wing wheel load sensor signal to a lower limit such that the control loop 1400 does not reduce the wing flex actuator pressure below either the lower limit pressure or the pressure corresponding to the lower limit of the wing wheel load sensor signal.

In other embodiments, the reference input 1412 is calculated according to the relation:

$$\text{Reference Input}=W_f(F_C-F_H-T/2)$$

Where:

Fc is the signal from the center wheel load sensor 822 associated with the center wheel on the same lateral side of the toolbar as the wing wheel.

In other embodiments, the reference input 1412 is calculated according to the relation:

$$\text{Reference Input}=W_f(F_C).$$

The wing weight transfer percentage $W_f$ is preferably a predetermined value or may be based on user inputs as described herein. The wing weight transfer percentage is preferably based on a ratio between agronomic damage caused by weight on the center wheels and agronomic damage caused by weight on the wing wheels. The wing weight transfer percentage $W_f$ is preferably between 5 percent and 20 percent.

Figure 24:
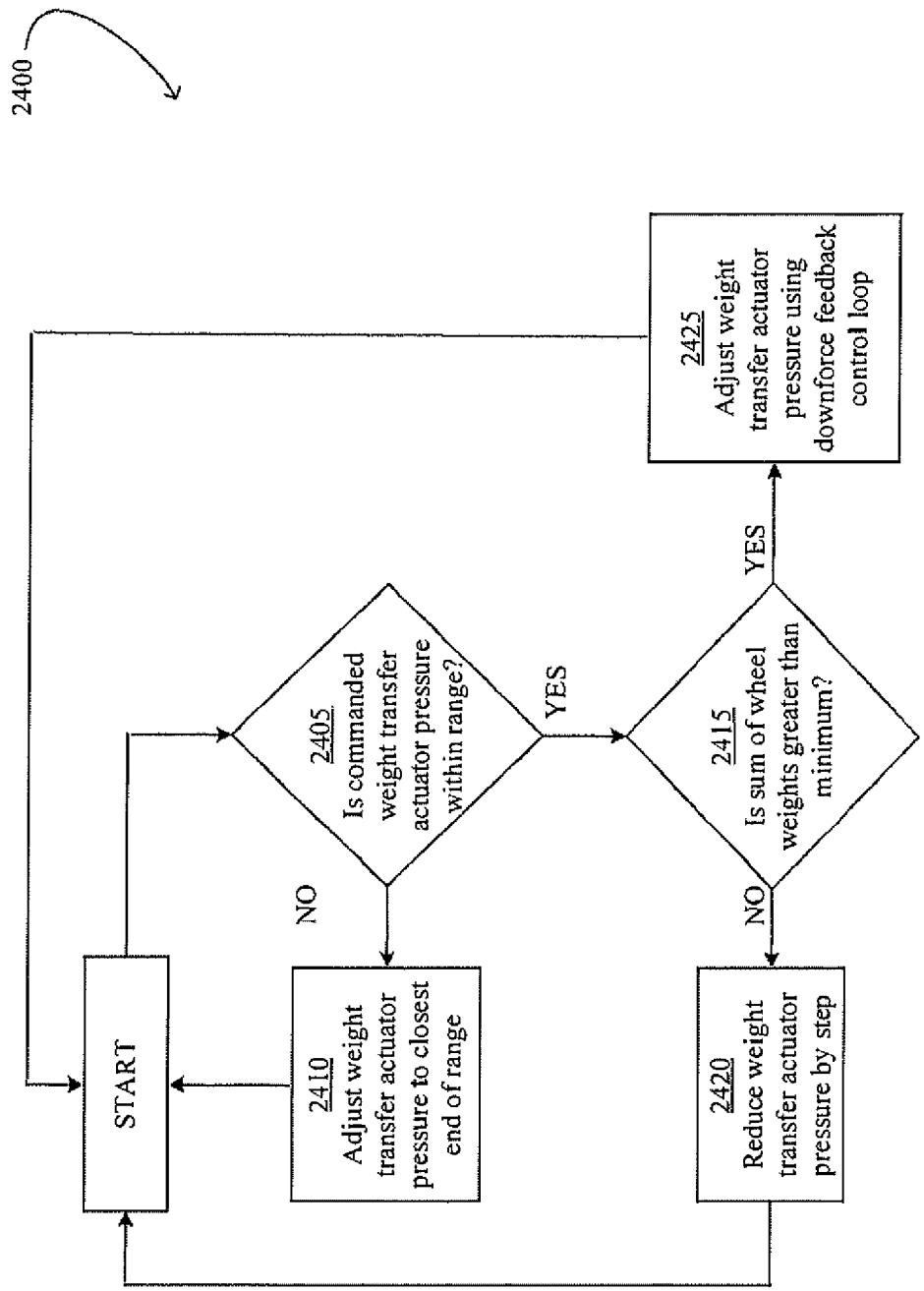
FIG. 24 illustrates an embodiment of a process for transferring weight between a toolbar and a tractor.

A method 2400 for controlling the pressure in the weight transfer actuator 520 is illustrated in FIG. 24. At step 2405, the monitor 830 determines whether the currently commanded hitch pressure is within a predetermined range. For purposes of this disclosure, down pressure is considered positive and lift pressure is considered negative. In embodiments in which the weight transfer assembly 500 is mounted to a quick-coupler, the upper limit of the predetermined range applied at step 2405 is preferably approximately equal to the weight of the weight transfer assembly 500 such that the weight transfer actuator 520 is enabled to shift the weight of the weight transfer assembly to the planter but is prevented from raising the three-point hitch or lifting the weight transfer assembly from the three-point hitch. In embodiments in which the weight transfer assembly 500 is mounted to a quick-coupler, the lower limit of the predetermined range applied at step 2405 is preferably determined in order to avoid tipping the tractor or losing traction on the front wheels of the tractor. For example, the lower limit may be based on the weight of the tractor, the distance between the center of gravity of the tractor and the tractor rear axle, the weight of the toolbar (preferably estimated at full weight with all crop input tanks loaded), and the distance between the center of gravity of the toolbar in the field position and the tractor rear axle such that a sufficient amount of weight is applied between the tractor front wheels and the ground.

If the weight transfer actuator pressure is outside the predetermined range of step 2405, at step 2410 the monitor 830 adjusts the weight transfer actuator pressure to the closest end of the predetermined range. For example, if the commanded weight transfer actuator pressure is less (more negative) than predetermined minimum, the monitor 830 adjusts the weight transfer actuator pressure to the predetermined minimum.

If the weight transfer actuator pressure is within the predetermined range of step 2405, at step 2415 the monitor 830 preferably determines whether the sum of the toolbar wheel weights (i.e., the sum of the signals from the center wheel load sensors 822 and the wing wheel load sensors 862) is at least a predetermined minimum, e.g., 4000 pounds. In other embodiments, the monitor 830 instead determines whether the sum of the center wheel load sensor signals is at least another predetermined minimum. It should be appreciated that a minimum weight on the toolbar weight is required in order for ground-engaging tools to function properly, e.g., for planter row units to achieve full trench depth; thus the predetermined minimum is preferably empirically determined in order to ensure that the ground-engaging tools can properly engage the ground. If the sum of the toolbar wheel weights is less than the predetermined minimum of step 2415, then at step 2420 the monitor 830 preferably reduces the weight transfer actuator pressure by a step (e.g., by a predetermined interval, by a predetermined percentage of the current actuator pressure, or using a PID algorithm).

If the sum of the toolbar wheel weights is less than the predetermined minimum of step 2415, then at step 2425 the monitor 830 preferably adjusts the weight transfer actuator pressure using a control loop based on wheel downforce (e.g., the sum of the signals from the center wheel load sensors 822) in order to minimize the agronomic damage to the soil by the tractor wheels and the toolbar center wheels.

Figure 15:
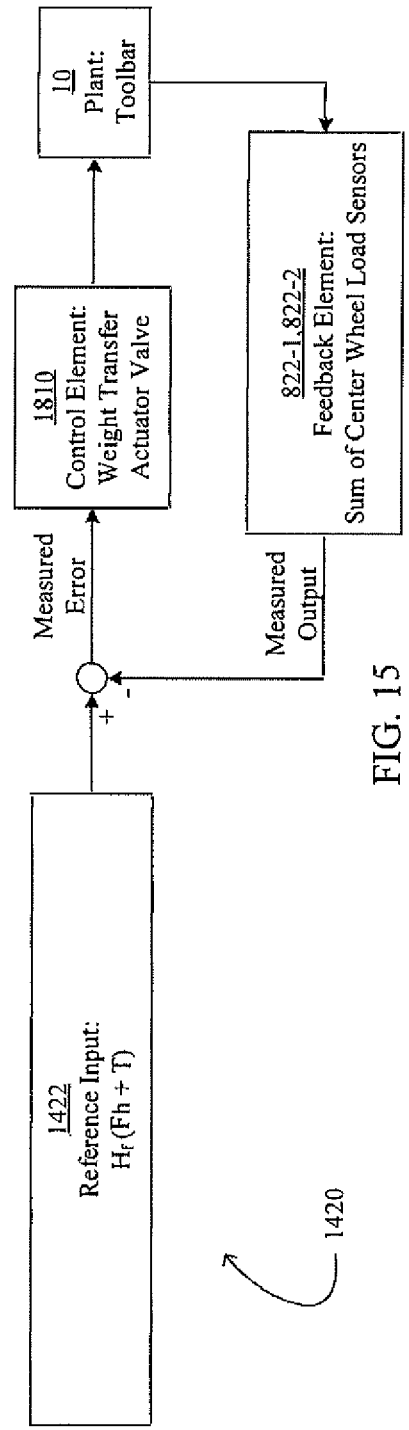
FIG. 15 illustrates an embodiment of a control loop for controlling a weight transfer actuator of an agricultural toolbar.

It has been determined empirically that approximately 80% of the compaction of soil (and related agronomic damage) occurs during the first compaction event. Thus where the center wheel assemblies 200 follow in the path of the tractor wheels or tracks, agronomic benefits result from equalized loads between the rear tractor wheels and the center wheel assemblies. Thus a control loop 1420 to be used at step 2425 of the process 2400 for adjusting the pressure in the weight transfer actuator 520 in a weight-balancing mode is illustrated in FIG. 15. In the control loop 1420, the monitor 830 compares the sum of the measured outputs of the center wheel load sensor 822-1, 822-2 with a reference input 1422 preferably calculated according to the following relation:

$$\text{Reference Input}=H_f(F_{H+T})$$

Where:

$H_f$ is the hitch weight transfer percentage expressed as a fraction; and $F_H$ and T are the values described above with respect to FIG. 14A.

The monitor 830 adjusts the pressure in the control valve 1810 associated with the weight transfer actuator 520 in order to reduce the measured error between the reference input 1422 and the sum of the measured output of the center wheel load sensors 822.

In some embodiments, the hitch weight transfer fraction $H_f$ is entered in the fields 2030 of the automatic mode setup screen 2000 for storage in the memory of the monitor 830 as described above. In other embodiments, the hitch weight transfer fraction $H_f$ is determined in order to equalize the agronomic damage done by the tractor rear wheels or tracks and the toolbar center wheels. Depending on the variables including the model of the tractor, the types of tractor wheels or tracks, and the toolbar wheel configuration, and the type of toolbar wheels (all of which may preferably be selected using a screen similar to the screen 2200 described herein with reference to FIG. 22), an individual agronomic damage multiplier may be applied to each tractor tire (or track) and each toolbar center wheel tire. The monitor 830 is preferably configured to select agronomic damage multipliers from an empirical lookup table stored in memory and calculate a hitch weight transfer fraction $H_f$ based on such variables selected or entered into the monitor by the operator. For purposes of illustration, the agronomic damage multiplier may be related to the contact area between each tire (or track) and the ground; it should be appreciated that the multiplier associated with each wheel is related to the amount of agronomic damage caused by the wheel per pound of ground force applied by the wheel. In embodiments such as the toolbar embodiments described herein in which each center wheel assembly has multiple wheels following in the same track, the economic damage multiplier associated with the entire center wheel assembly preferably is inversely related to the number of wheels in the center wheel assembly. The hitch weight transfer fraction $H_f$ is preferably related to a ratio between the toolbar center wheel tire agronomic damage multiplier and the tractor wheel tire (or track) agronomic damage multiplier.

Alternative Embodiments

In other embodiments of the control system 800, the solenoid operated valves are in electrical communication with an electronic control box located in the tractor cab such that the operator may alter the operating states of the valves without use of the monitor 830. Thus in methods disclosed herein in which the monitor 830 commands a change in operational state of a solenoid operated valve, it should be appreciated that the operator may accomplish such steps using such an electronic control box.

The disclosure of International Patent Application Publication WO 2012/167258 A1, "Agricultural toolbar apparatus, systems, and methods," published Dec. 6, 2012, is hereby incorporated herein in its entirety by reference.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. An agricultural implement, comprising:
   an agricultural toolbar having a hitch assembly, and a weight transfer assembly coupled to the hitch assembly;
   a center bar coupled to the weight transfer assembly;
   at least one center wheel assembly coupled to the center bar;
   a first wing assembly comprising a first inner wing section and a first outer wing section, and a second wing assembly comprising a second inner wing section and a second outer wing section, the wing assemblies coupled to opposite sides of the center bar, each of the first wing assembly and the second wing assembly including at least one wing wheel assembly extending therefrom and a wing fold actuator configured to fold the wing assemblies from a position wherein the wing assemblies are in substantial alignment with the center bar to a position wherein the wing assemblies are substantially perpendicular to the center bar;
   a weight management control system operably connected to the center bar, the first wing assembly, and the second wing assembly, the weight management control system comprising a plurality of sensors and configured to adjust a net pressure on the first wing and the second wing assemblies based, at least in part, on relative loads acting on the at least one center wheel assembly and the wing wheel assemblies, and wherein the loads comprise a weight on the agricultural implement including a weight of the wing assemblies and a ground force on the at least one center wheel assembly and wing wheel assemblies;
   a plurality of wing flex actuators operatively connected to the weight management control system, wherein at least one of the plurality of wing flex actuators operatively connects the first inner wing section and the first outer wing section, wherein at least one of the plurality of wing flex actuators operatively connects the second inner wing section and the second outer wing section, and wherein the weight distribution system is configured to adjust the plurality of wing flex actuators based on the plurality of sensors to redistribute the load between the at least one center wheel assembly and the wing wheel assemblies.

2. The agricultural implement of claim 1, further comprising a user interface electrically connected to the weight management control system to display actual weight transfer parameters and receive desired weight transfer parameters.

3. The agricultural implement of claim 1, wherein the plurality of sensors is positioned at the central wheels and the wing wheels.

4. The agricultural implement of claim 3, wherein the plurality of sensors comprises a plurality of load sensors.

5. The agricultural implement of claim 1, wherein the first inner wing section and the second inner wing section are pivotally coupled to the center bar.

6. The agricultural implement of claim 1, wherein the at least one center wheel assembly is pivotally coupled to the center bar.

7. The agricultural implement of claim 1, wherein the at least one center wheel assembly comprises at least two center wheel assemblies coupled to distal ends of the center bar.

8. The agricultural implement of claim 1, wherein the at least one center wheel assembly is coupled to the center bar by at least one center wheel actuator.

9. The agricultural implement of claim 8, wherein adjustment of the at least one center wheel actuator raises and lowers the agricultural toolbar.

10. The agricultural implement of claim 8, wherein the at least one center wheel actuator comprises a dual-acting hydraulic cylinder.

11. The agricultural implement of claim 1, wherein the wing wheel assemblies are each coupled to respective outer wing sections by at least one actuator.

12. The agricultural implement of claim 11, wherein adjustment of the at least one actuator raises and lowers the respective outer wing section.

13. The agricultural implement of claim 11, wherein the at least one actuator comprises a dual-acting hydraulic cylinder.

14. A method of distributing weight about a center bar, a left wing assembly, and a right wing assembly of an agricultural implement, the method comprising:
   determining one or more characteristics associated with each of the center bar, the left wing assembly and the right wing assembly of the implement with one or more sensors, said one or more characteristics comprising a weight on the agricultural implement including a weight of the wing assemblies and ground forces on at least one center wheel assembly and left and right wing wheel assemblies; and
   using a weight management control system to actuate one or more of a plurality of wing flex actuators of the agricultural implement to independently adjust down force at the left wing assembly, the right wing assembly, or both the left wing assembly and the right wing assembly, based upon the one or more characteristics associated with two or more of the center bar, the left wing assembly, and the right wing assembly;
   wherein at least one of the plurality of wing flex actuators is operatively connected between an inner wing section and an outer wing section of the left wing;
   wherein at least one of the plurality of wing flex actuators is operatively connected between an inner wing section and an outer wing section of the right wing; and
   wherein the wing assemblies include wing fold actuators configured to fold the wing assemblies from a position wherein the wing assemblies are in substantial alignment with the center bar to a position wherein the wings are substantially perpendicular to the center bar.

15. The method of claim 14, further comprising continually adjusting the down force at one or both of the wing assemblies.

16. The method of claim 14, further comprising displaying information from the one or more sensors and the plurality of wing flex actuators on a user interface to allow manual or automatic adjustment of the down force.

* * * * *